US012247306B2

(12) United States Patent
Robert et al.

(10) Patent No.: US 12,247,306 B2
(45) Date of Patent: Mar. 11, 2025

(54) ELECTROCHEMICAL SYSTEM FOR THE SELECTIVE REDUCTION OF CARBON MONOXIDE INTO METHANOL

(71) Applicants: UNIVERSITE DE PARIS, Paris (FR); CENTRE NATIONAL DE LA RECHERCHE SCIENTIFIQUE, Paris (FR)

(72) Inventors: Marc Robert, Paris (FR); Etienne Boutin, Evian-les-Bains (FR)

(73) Assignees: UNIVERSITÉ PARIS CITÉ, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 465 days.

(21) Appl. No.: 17/605,600

(22) PCT Filed: Apr. 24, 2020

(86) PCT No.: PCT/EP2020/061554
§ 371 (c)(1),
(2) Date: Oct. 22, 2021

(87) PCT Pub. No.: WO2020/216946
PCT Pub. Date: Oct. 29, 2020

(65) Prior Publication Data
US 2022/0228274 A1    Jul. 21, 2022

(30) Foreign Application Priority Data

Apr. 24, 2019   (EP) .................................... 19305530

(51) Int. Cl.
*C25B 3/07*      (2021.01)
*C25B 1/23*      (2021.01)
(Continued)

(52) U.S. Cl.
CPC .................. *C25B 3/07* (2021.01); *C25B 1/23* (2021.01); *C25B 3/25* (2021.01); *C25B 3/26* (2021.01);
(Continued)

(58) Field of Classification Search
None
See application file for complete search history.

(56) References Cited

U.S. PATENT DOCUMENTS 11,643,736 B2 *  5/2023  Yamaguchi ............... C25B 9/19
                                                          205/345
2018/0066370 A1   3/2018  Yamada et al.
(Continued)

FOREIGN PATENT DOCUMENTS

DE    102015213947 A1 *  1/2017
WO    WO-2015139136 A1 *  9/2015  ............. B01D 53/22
(Continued)

OTHER PUBLICATIONS

Machine translation of Krause (DE 102015213947 A1) (Year: 2017).*
(Continued)

*Primary Examiner* — Harry D Wilkins, III

(57) ABSTRACT

The present invention describes an electrochemical system (1) to electrochemically reduce carbon monoxide (CO) into liquid methanol and gaseous $H_2$, comprising an electrochemical cell with an anodic compartment with an anode (2) with a current collector (2A), at least a catalyst to electrochemically oxidize $H_2O$, and a cathodic compartment with a cathodic electrolyte solution comprising the solvent (3), and a cathodic supporting electrolyte, the solvent (3) being water at basic pH of between 10.5 and 13.5, the reagent CO; a cathode (4) which comprises, on a current collector (4A) which is electrochemically inert, at least a cobalt molecular (Continued)

catalyst (4B) to electrochemically reduce CO into liquid methanol and the gas $H_2$, a power supply (5) providing the energy necessary to trigger the electrochemical reactions involving the reagent.

14 Claims, 13 Drawing Sheets

(51) Int. Cl.
    *C25B 3/25*     (2021.01)
    *C25B 3/26*     (2021.01)
    *C25B 11/032*     (2021.01)
    *C25B 11/085*     (2021.01)
    *C25B 15/025*     (2021.01)
    *C25B 15/08*     (2006.01)

(52) U.S. Cl.
    CPC .......... *C25B 11/032* (2021.01); *C25B 11/085* (2021.01); *C25B 15/025* (2021.01); *C25B 15/08* (2013.01)

(56) References Cited

U.S. PATENT DOCUMENTS

| | | | |
|---|---|---|---|
| 2019/0055656 A1* | 2/2019 | Kenis | C25B 3/25 |
| 2020/0131649 A1* | 4/2020 | Krause | C25B 11/031 |
| 2022/0025527 A1* | 1/2022 | Yamaguchi | C25B 3/26 |

FOREIGN PATENT DOCUMENTS

| | | | | |
|---|---|---|---|---|
| WO | 2018132937 A1 | 7/2018 | | |
| WO | WO-2020071376 A1 * | 4/2020 | ............... | C25B 1/04 |

OTHER PUBLICATIONS

Machine translation of Brereton (WO 2015139136 A1) (Year: 2015).*
Abdinejad et al, Enhanced Electrochemical Reduction of CO2 Catalyzed by Cobalt and Iron Amino Porphyrin Complexes, ACS Applied Energy Materials, vol. 2, No. 2, Jan. 2019, pp. 1330-1335 (Year: 2019).*
Morlanes et al., Simultaneous Reduction of CO2 and Splitting of H2O by a Single Immobilized Cobalt Phthalocyanine Electrocatalyst , ACS Catalysis, vol. 6, No. 5, Apr. 2016, pp. 3092-3095 (Year: 2016).*
Choi et al, Steric Modification of a Cobalt Phthalocyanine/ Graphene Catalyst To Give Enhanced and Stable Electrochemical CO2 Reduction to CO, ACS Energy Letters, vol. 4, No. 3, Feb. 2019, pp. 666-672 (Year: 2019).*
International Search Report & Written Opinion in PCT/EP2020/061554 dated Jun. 23, 2020, 13 pages.
Albo, et al. "Production of methanol from CO2 electroreduction at Cu2O and Cu2O/ZnO-based electrodes in aqueous solution." Applied Catalysis B: Environmental. Apr. 30, 2015. 26 pages.
Chang, et al. "Electrochemical reduction of CO2 by Cu2O-catalyzed carbon clothes." Materials Letters. vol. 63. Jan. 31, 2009. pp. 1001-1003.
Haas, et al. "Technical photosynthesis involving CO2 electrolysis and fermentation." Nature Catalysis. vol. 1. Jan. 2018. pp. 32-39.
Hatsukade, et al. "Carbon Dioxide Electroreduction using a Silver-Zinc Alloy." Energy Technology. vol. 5. 2017. pp. 955-961.
Kas, et al. "Electrochemical CO2 reduction on Cu2O-derived copper nanoparticles: Controlling the catalytic selectivity of hydrocarbons." Physical Chemistry Chemical Physics. May 2014. vol. 16. pp. 12194-12201.
Kuhl, et al. "Electrocatalytic Conversion of Carbon Dioxide to Methane and Methanol on Transition Metal Surfaces." Journal of the American Chemical Society. Sep. 26, 2014. vol. 136. pp. 14107-14113.
Wang, et al. "CO2 electrochemical catalytic reduction with a highly active cobalt phthalocyanine." Nature Communications. Aug. 9, 2019. vol. 10. pp. 1-8.
Wang, et al. "A Hybrid Co Quaterpyridine Complex/Carbon Nanotube Catalytic Material for CO2 Reduction in Water." Angewandte Chemie International Edition. Mar. 2018. vol. 57. pp. 7769-7773.
Yoshida, et al. "Selective Electocatalysis for CO2 reduction in the aqueous phase using cobalt phthalocyanine / poly-4-vinylpyridine modified electrodes." Journal of Electroanalytical Chemistry. vol. 385. 1995. pp. 209-225.
Kusuda, et al. "Electrochemical investigation of thin films of cobalt phthalocyanine and cobalt-4,4',4",4'''-tetracarboxyphthalocyanine and the reduction of carbon monoxide, formic acid and formaldehyde mediated by the Co (I) complexes." Electrochimica Acta. vol. 31, Issue No. 6. 1986. pp. 657-663.
Kapusta, et al. "Carbon Dioxide Reduction at a Metal Phthalocyanine Catalyzed Carbon Electrode." Journal of The Electrochemical Society. vol. 131, Issue No. 7. Jul. 1984. pp. 1511-1514.
Jing Shen, et al. "Electrocatalytic reduction of carbon dioxide to carbon monoxide and methane at an immobilized cobalt protoporphyrin." Nature Communications. vol. 6. Sep. 1, 2015. pp. 1-8.

* cited by examiner

ELECTROCHEMICAL SYSTEM FOR THE SELECTIVE REDUCTION OF CARBON MONOXIDE INTO METHANOL

FIELD OF THE INVENTION

The invention concerns a system that electrochemically reduces carbon monoxide (CO) into liquid methanol and gaseous $H_2$, with a molecular catalyst.

STATE OF ART

In the perspective of switching from fossil fuels to renewable fuels, electrochemical reduction of carbon dioxide ($CO_2$) into methanol (MeOH) is considered as a major target. To catalyze the 6 electron, 6 proton reduction of $CO_2$ to MeOH, efforts have been devoted to the use of metal oxides, metal alloys or chalcogenide based catalytic electrodes[1-4]. Most of these materials suffer from a lack of selectivity with the generation of more reduced products (e.g. methane or C2 molecules) or require the use of rare metals[5,6]. Additional stability issues arise when working outside the thermodynamic stability window of the oxides[7] leading back to the low activity observed with metal electrodes for MeOH production[8]. One promising strategy to achieve high selectivity is to use molecular catalysts so as to precisely control the structure of the active site. Even though such strategy has been successfully implemented for $CO_2$ to carbon monoxide (CO) production[9,10], no molecular catalyst has been yet shown to perform the reaction up to MeOH. Only a series of reports have been published in the 80s' with transition metal complexes but which needed assistance from heterogeneous co-catalyst (Everitt's salt) deposited on a platinum electrode to show some methanol evolution[11-13]. Because the reduction of $CO_2$ into CO can be considered as almost mature,[14-16,] the present patent focuses on the subsequent and challenging reduction of CO into methanol.

SUMMARY OF THE INVENTION

Here, the invention presents an electrochemical system to electrochemically reduce carbon monoxide, preferably dissolved in water, into methanol at an electrode coated with a specific ink. Applied potential and pH of the electrolyte are of high importance to get better Faradaic Efficiency (FE) and are described in this invention.

The electrochemical system to electrochemically reduce CO into liquid methanol and gaseous $H_2$, comprises an electrochemical cell with:
  an anodic compartment with:
    an anode with a current collector, and on the current collector, at least a catalyst to electrochemically oxidize $H_2O$ to $O_2$,
    an anodic electrolyte solution comprising a solvent, and an anodic supporting electrolyte, the solvent being water, at a basic pH of between 10.5 and 13.5
  a cathodic compartment with:
    a cathodic electrolyte solution comprising the solvent, and a cathodic supporting electrolyte, the solvent being water, at a basic pH of between 10.5 and 13.5, the reagent CO;
    a cathode which comprises, on a current collector which is electrochemically inert, at least a molecular catalyst to electrochemically reduce CO into liquid methanol and gaseous $H_2$, the molecular catalyst being selected:
    from the compounds of having the formula:

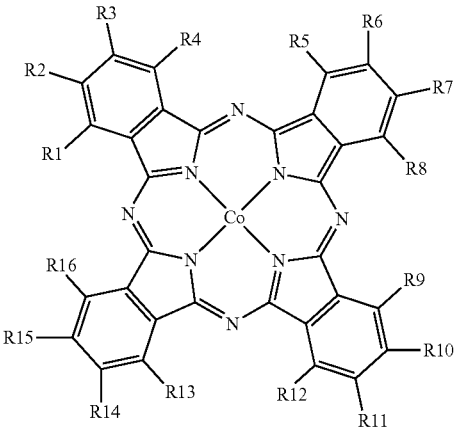

wherein:
$R_1$ to $R_{16}$ are independently selected from the groups consisting of H, F, $^+N(C_1\text{-}C_4\text{ alkyl})_3$ group, or
one or several of the specific following $R_1$, $R_4$, $R_5$, $R_8$, $R_9$, $R_{12}$, $R_{13}$ and $R_{16}$ groups being a phenyl group bearing $^+N(C_1\text{-}C_4\text{ alkyl})_3$ substituent in ortho position, the others Ri being H;
Or the compound of formula:

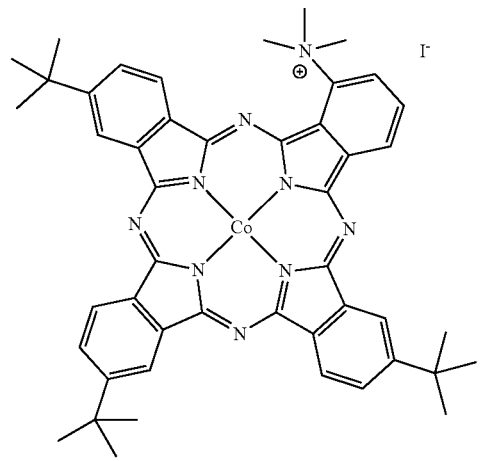

a power supply providing the energy necessary to trigger the electrochemical reactions involving the reagent.

BRIEF DESCRIPTION OF THE DRAWINGS

Other advantages and characteristics of the disclosed devices and methods will become apparent from reading the description, illustrated by the following figures, where.

DETAILED DESCRIPTION

Figure 1:
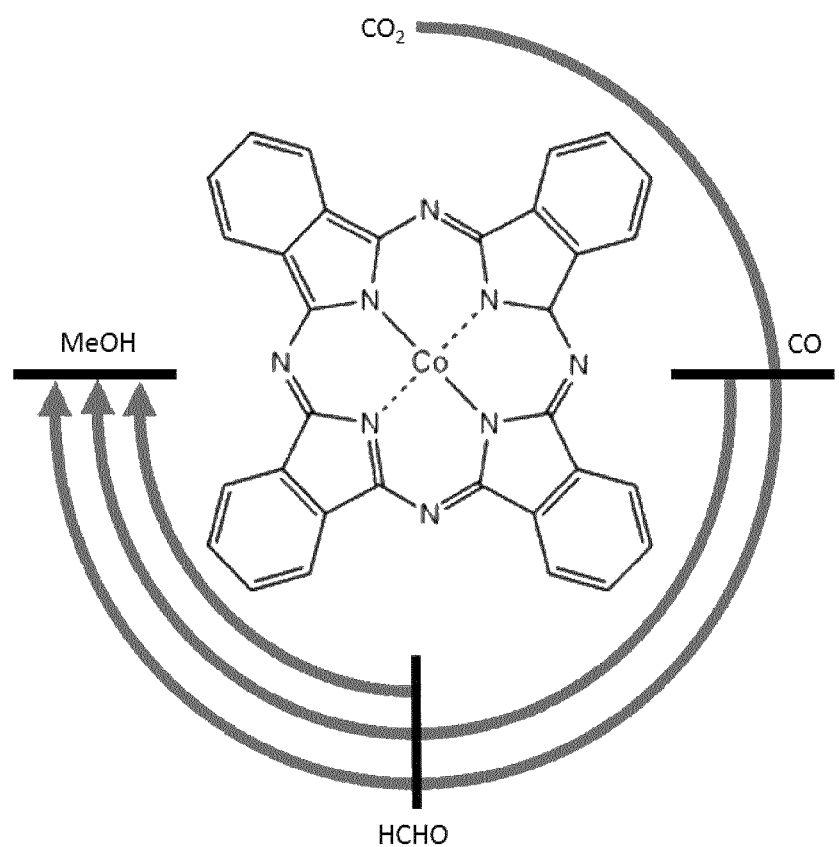
FIG. 1 represents the possible sequences for $CO_2$ electrochemical reduction to methanol, starting from $CO_2$ itself, CO or HCHO with one of the possible molecular catalysts, the unsubstituted cobalt phthalocyanine (CoPc) in the center.

Electrochemical System to Electrochemically Reduce CO into Liquid Methanol and Gaseous H$_2$ An object of present invention is the electrochemical system to electrochemically reduce CO into liquid methanol and gaseous H$_2$, comprises an electrochemical cell with:
an anodic compartment with:
an anode with a current collector, and on the current collector, at least a catalyst to electrochemically oxidize H$_2$O to O$_2$,
an anodic electrolyte solution comprising a solvent, and an anodic supporting electrolyte, the solvent being water, at a basic pH of between 10.5 and 13.5
a cathodic compartment with:
a cathodic electrolyte solution comprising the solvent, and a cathodic supporting electrolyte, the solvent being water, at a basic pH of between 10.5 and 13.5,
the reagent CO;
a cathode which comprises, on a current collector which is electrochemically inert, at least a molecular catalyst to electrochemically reduce CO into liquid methanol and gaseous H$_2$, the molecular catalyst being selected:
from the compounds of having the formula:

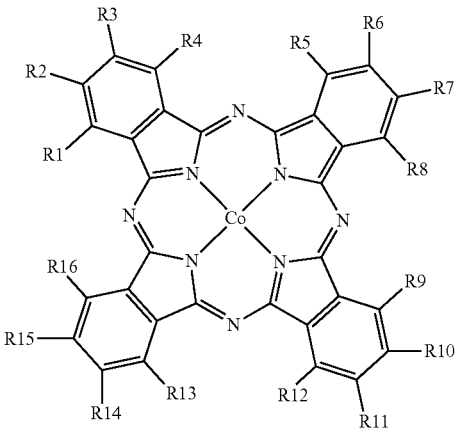

wherein:
R$_1$ to R$_{16}$ are independently selected from the groups consisting of H, F, $^+$N(C$_1$-C$_4$ alkyl)$_3$ group, and
one or several of the specific following R$_1$, R$_4$, R$_5$, R$_8$, R$_9$, R$_{12}$, R$_{13}$ and R$_{16}$ groups being a phenyl group bearing $^+$N(C$_1$-C$_4$ alkyl)$_3$ substituent in ortho position;
Or the compound of formula:

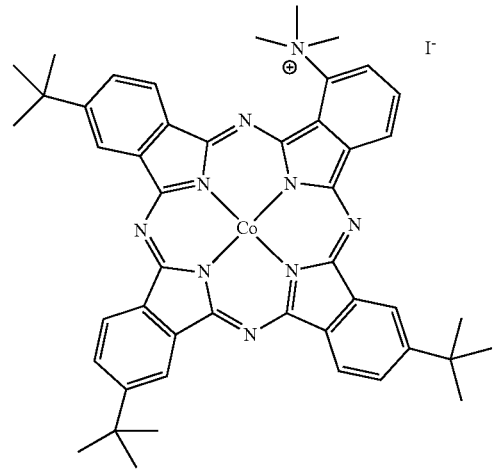

a power supply providing the energy necessary to trigger the electrochemical reactions involving the reagent.

Another object of the present invention is an electrochemical system 1 to electrochemically reduce CO into liquid methanol and gaseous H$_2$, comprising an electrochemical cell with:
an anodic compartment with:
an anode 2 with a current collector 2A, and on the current collector 2A, at least a catalyst 2B (for instance, Pt/Ti alloy, Iridium oxide nanoparticles), or other non-noble metal oxides (Co, mixed Co/Ni for example) to electrochemically oxidize H$_2$O to O$_2$, an anodic electrolyte solution comprising a solvent 3, and an anodic supporting electrolyte, the solvent 3 being water at basic pH;

a cathodic compartment with:
- a cathodic electrolyte solution comprising the solvent 3, and a cathodic supporting electrolyte, the solvent 3 being water at basic pH,
- the reagent CO;
- a cathode 4 which comprises on a current collector 4A, which is electrochemically inert, at least a molecular catalyst 4B to electrochemically reduce CO into liquid methanol and the gas $H_2$,
- the molecular catalyst 4B with the formula:

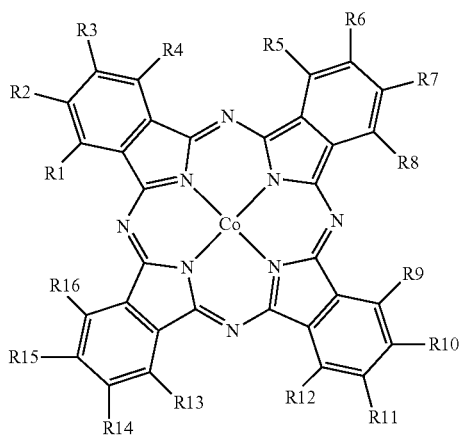

$R_2$, $R_3$, $R_6$, $R_7$, $R_{10}$, $R_{11}$, $R_{14}$ and $R_{15}$ are independently selected from the elements consisting of H or F, or the groups consisting of $^+N(C_1$-$C_4$ alkyl$)_3$ group or $C(C_1$-$C_4$ alkyl$)_3$ group, or $R_1$ $R_4$, $R_5$, $R_8$, $R_9$, $R_{12}$, $R_{13}$ and $R_{16}$ are independently selected from the elements H or F, or groups consisting of $^+N(C_1$-$C_4$ alkyl$)_3$ group, $C(C_1$-$C_4$ alkyl$)_3$ group, or phenyl group bearing itself a +N($C_1$-$C_4$ alkyl)3 group in ortho position, a power supply 5 providing the energy necessary to trigger the electrochemical reactions involving the reagent.

The cathode 4 comprises on the current collector 4A an electrode film deposit which contains: the molecular catalyst 4B, at least a binder, and optionally conductive materials as additives.

The molecular catalyst 4B in the electrode film deposit can be in a concentration of between 1 nmol·cm$^{-2}$ and 100 µmol·cm$^{-2}$.

In a realization, the cathodic current collector 4A is carbon paper, the binder is Nafion© resin, the conductive material (additives) are made of carbon nanotubes, or carbon powder, or reduced graphene oxide or graphite powder.

In a first embodiment, the molecular catalyst 4B comprises at least 1 and at most 8 groups among $R_1$ to $R_{16}$ being independently $^+N(C_1$-$C_4$ alkyl$)_3$, and the other groups among $R_1$ to $R_{16}$ are H.

For instance, the molecular catalyst 4B can be a cobalt phthalocyanine CoPc2 of formula (II):

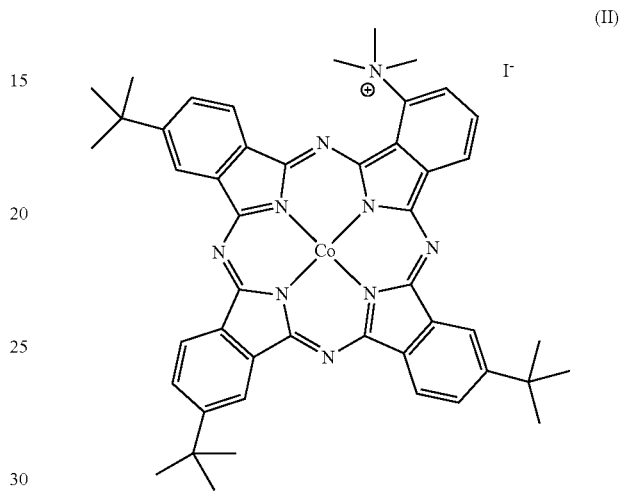

or a cobalt phthalocyanine CoPc3 of formula (III):

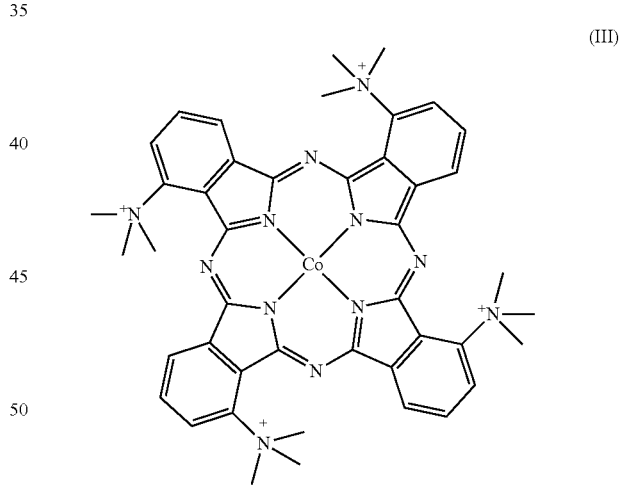

In a second embodiment, the molecular catalyst 4B comprises at least 1 to 16 groups among $R_1$ to $R_{16}$ being independently F, and the other groups among $R_1$ to $R_{16}$ are H.

In a third embodiment, the molecular catalyst 4B comprises at least 1 and at most 8 groups among $R_1$, $R_4$, $R_5$, $R_8$, $R_9$, $R_{12}$, $R_{13}$ and $R_{16}$ being independently a phenyl group bearing $^+N(C_1$-$C_4$ alkyl$)_3$ group in ortho position, and the other groups among $R_1$ to $R_{16}$ are H.

In a fourth embodiment, $R_1$ to $R_{16}$ are H and the molecular catalyst 4B is a cobalt phthalocyanine CoPc of formula (I):

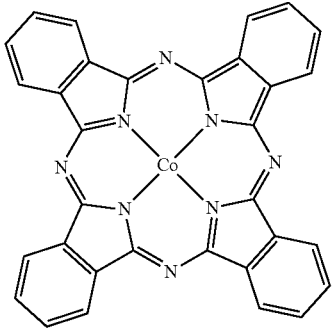

(I)

Advantageously, the solvent 3 of the anodic electrolyte solution and of the cathodic electrolyte solution has a pH between 10.5 and 13.5. In particular, the solvent 3 has a pH between 12 and 13.

The cathodic supporting electrolyte can comprise a phosphate buffer or potassium hydroxide, and the anodic supporting electrolyte can comprise a phosphate buffer or potassium hydroxide.

The potential applied to the cathode 4 is between −0.50 V and −0.70 V versus RHE.

The electrochemical reduction of the reagent into methanol and $H_2$ is carried out at room temperature.

The electrochemical reduction of the CO reagent into methanol and $H_2$ can be carried out at 1 bar of CO.

The electrochemical reduction of the CO reagent into methanol and $H_2$ can be carried out at several bars of CO.

The electrochemical cell 1 can be advantageously a flow cell to electrochemically reduce a gas reactant comprising CO, passing through a gas diffusion electrode 19, into methanol.

This flow cell presents an anodic compartment comprising:
- an anode with a current collector, and on the current collector, at least one molecular catalyst 12 to electrochemically oxidize $H_2O$ to $O_2$,
- an anodic electrolyte solution 13, at a controlled flow rate $Q_a$, comprising: a solvent, and an anodic electrolyte, the solvent being water,
- an anodic electrolyte solution inlet 14 and an anodic electrolyte solution outlet 15 connected to the anodic compartment, to circulate the anodic electrolyte solution 13;

This flow cell presents also a cathodic compartment comprising:
- a cathodic electrolyte solution 16, at a controlled flow rate $Q_c$, comprising: a solvent, and a cathodic electrolyte, the solvent being water $H_2O$,
- a cathodic electrolyte solution inlet 17 and a cathodic electrolyte solution outlet 18 connected to the cathodic compartment, to circulate the cathodic electrolyte solution, and the remaining reagent gas CO and the methanol by the outlet;
- a gas diffusion electrode 19 comprising on an electrochemically inert gas diffusion porous current collector of surface S, at least the molecular catalyst 19a to electrochemically reduce the gas reactant comprising CO into methanol in the cathodic electrolyte solution, with by-production of gaseous $H_2$, This flow cell presents also:
- an anion exchange membrane 20, impermeable to CO, $H_2$ and $O_2$, between the anodic compartment and the cathodic compartment;
- a channel 21 for passing the reagent gas CO, at a controlled flow rate $Q_g$, through the porous surface S of the gas diffusion electrode 19, while the catholyte electrolyte solution circulates in between the gas diffusion electrode 19 and the anion exchange membrane 20

Pumping means serving to:
Circulate by pumping the anodic electrolyte solution in the anodic compartment and the cathodic electrolyte solution 16 in the cathodic compartment between the inlet 17 and the outlet 18,
Control flow by pumping the comprising gas CO in the channel 21, passing through the gas diffusion porous cathode 19.

The molecular catalyst 19a is defined in previous pages (molecular catalyst 4B).

Advantageously, the solvent of the anodic electrolyte solution and of the cathodic electrolyte solution has a pH between 10.5 and 13.5. In particular, the solvent 3 has a pH between 12 and 13.

The flow cell allows to have a higher selectivity and higher current densities.

Electrochemical Device to Electrochemically Reduce $CO_2$ into Methanol and Gaseous $H_2$ The present invention concerns also an electrochemical device to electrochemically reduce $CO_2$ into methanol and gaseous $H_2$, comprising:
- a first electrochemical system 1' to electrochemically reduce $CO_2$ into CO, with a molecular catalyst 4B'
- a second electrochemical system 1 to electrochemically reduce CO into methanol and gaseous $H_2$, as previously described and which can be, for example, a flow cell with the molecular catalyst 19a In a first embodiment of the electrochemical device, the first electrochemical system 1' to electrochemically reduce $CO_2$ into CO, can comprises an electrochemical cell with:
an anodic compartment with:
- an anode 2' with a current collector 2A', and on the current collector 2A', at least a catalyst 2B' (for instance Pt/Ti alloy, Iridium oxide nanoparticles), or other non-noble metal oxides (Co oxide, Co/Ni mixed oxide for example)) to electrochemically oxidize $H_2O$,
- an anodic electrolyte solution comprising a solvent 3', and an anodic supporting electrolyte, the solvent 3' being water;

a cathodic compartment with:
- a cathodic electrolyte solution comprising the solvent 3', and a cathodic supporting electrolyte, the solvent 3' being water,
- the reagent $CO_2$;
- a cathode 4' which comprises, on a current collector 4A', at least a molecular catalyst 4B' to electrochemically reduce $CO_2$ into CO, with the formula:

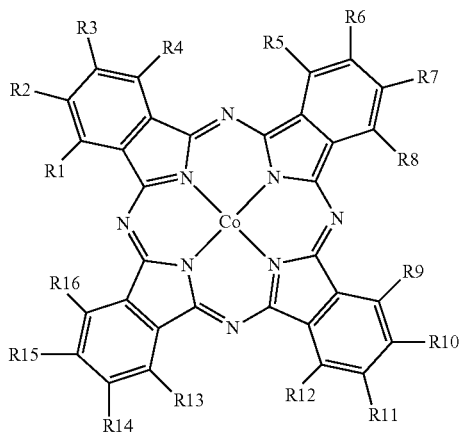
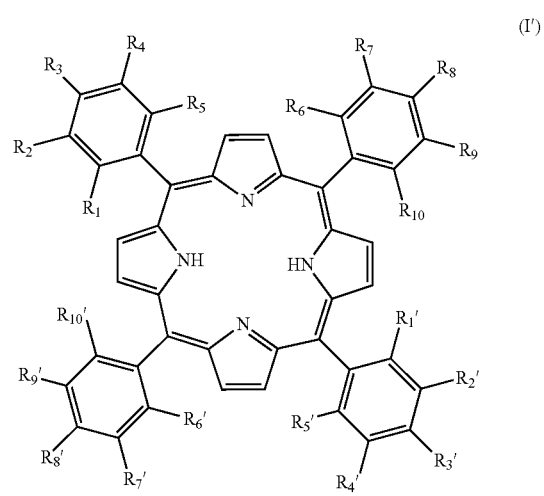

wherein:

R$_1$ to R$_{16}$ are independently selected from the groups consisting of H, F or $^+$N(C$_1$-C$_4$ alkyl)$_3$ or one or several of the specific following R$_1$, R$_4$, R$_5$, R$_8$, R$_9$, R$_{12}$, R$_{13}$ and R$_{16}$ group being a phenyl group bearing $^+$N(C$_1$-C$_4$ alkyl)$_3$ substituent in ortho position.

in a particular embodiment, advantageously:

R$_2$, R$_3$, R$_6$, R$_7$, R$_{10}$, R$_{11}$, R$_{14}$ and R$_{15}$ are independently selected from the elements consisting of H or F, or the groups consisting of $^+$N(C$_1$-C$_4$ alkyl)$_3$ group or C(C$_1$-C$_4$ alkyl)$_3$ group; or R$_1$ R$_4$, R$_5$, Ra, R$_9$, R$_{12}$, R$_{13}$ and R$_{16}$ are independently selected from the elements H or F, or groups consisting of $^+$N(C$_1$-C$_4$ alkyl)$_3$ group, C(C$_1$-C$_4$ alkyl)$_3$ group, or phenyl group bearing itself a +N(C$_1$-C$_4$ alkyl)3 group in ortho position.

a power supply 5 providing the energy necessary to trigger the electrochemical reactions involving the reagent;

For this, the first electrochemical system 1' to electrochemically reduce CO$_2$ into CO wherein, the potential applied to the cathode 4' is between −0.12 V and −0.70 V versus RHE;

the pH is between 4 and 14 even though basic pH will naturally turn back to neutral in presence of CO$_2$.

Advantageously, the first electrochemical system 1' to electrochemically reduce CO$_2$ into CO, presents the same molecular catalyst 4B' than the molecular catalyst 4B of the second electrochemical system 1 to electrochemically reduce CO into methanol and gaseous H$_2$, as previously described.

Advantageously, the solvent of the anodic electrolyte solution 3' and of the cathodic electrolyte solution has a pH between 10.5 and 13.5. In particular, the solvent 3' has a pH between 12 and 13.

In a second embodiment of the electrochemical device, the first electrochemical system 1' to electrochemically reduce CO$_2$ into CO, can present a complex of a porphyrin of formula below:

wherein R$_1$ to R$_{10}$ and R$_{1'}$ to R$_{10'}$ are independently selected from the group consisting of H, F and $^+$N(C$_1$-C$_4$ alkyl)$_3$, and wherein:

at least 2 and at most 8 groups among R$_1$ to R$_{10}$ and R$_{1'}$ to R$_{10'}$ being independently $^+$N(C$_1$-C$_4$ alkyl)$_3$, with iron in the oxidation state 0 to +III, and salts thereof, as catalyst for the electrochemical reduction of CO$_2$ into CO in water, wherein CO$_2$ is reduced into CO by the porphyrin of formula (I) with iron in the state Fe(0).

In a third embodiment, all the systems known from the state of the art can be used to to electrochemically reduce CO$_2$ into CO, such as:

gold Nanoneedles or silver nanoparticles for materials, iron porphyrins or cobalt quaterpyridine or cobalt phthalocyanine as concerns molecular catalysts.

In another embodiment, the electrochemical system (1') to electrochemically reduce CO$_2$ into CO, comprises an electrochemical cell with:

an anodic compartment with:

an anode (2') with a current collector (2A'), and on the current collector (2A'), at least a catalyst (2B') to electrochemically oxidize H$_2$O, an anodic electrolyte solution comprising a solvent (3'), and an anodic supporting electrolyte, the solvent (3') being water at a pH of between 10.5 and 13.5;

a cathodic compartment with:

a cathodic electrolyte solution comprising the solvent (3'), and a cathodic supporting electrolyte, the solvent (3') being water at a pH of between 10.5 and 13.5;

the reagent CO$_2$;

a cathode (4') which comprises, on a current collector (4A'), at least a molecular catalyst (4B') to electrochemically reduce CO$_2$ into CO, with the formulae:

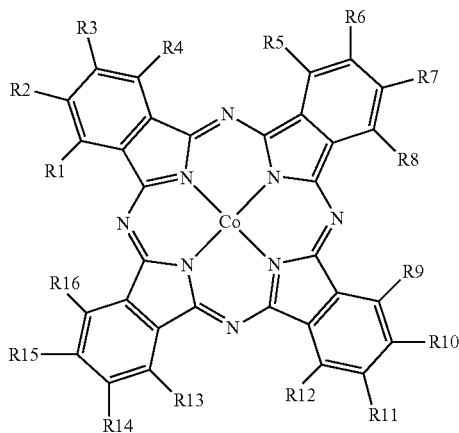

wherein:

$R_1$ to $R_{16}$ are independently selected from the groups consisting of H, F or $^+N(C_1$-$C_4$ alkyl$)_3$ or one or several of the specific following $R_1$, $R_4$, $R_5$, $R_8$, $R_9$, $R_{12}$, $R_{13}$ and $R_{16}$ group being a phenyl group bearing $^+N(C_1$-$C_4$ alkyl$)_3$ substituent in ortho position, the others Ri being H;

a power supply (5) providing the energy necessary to trigger the electrochemical reactions involving the reagent;

ONE EMBODIMENT

Figure 4:
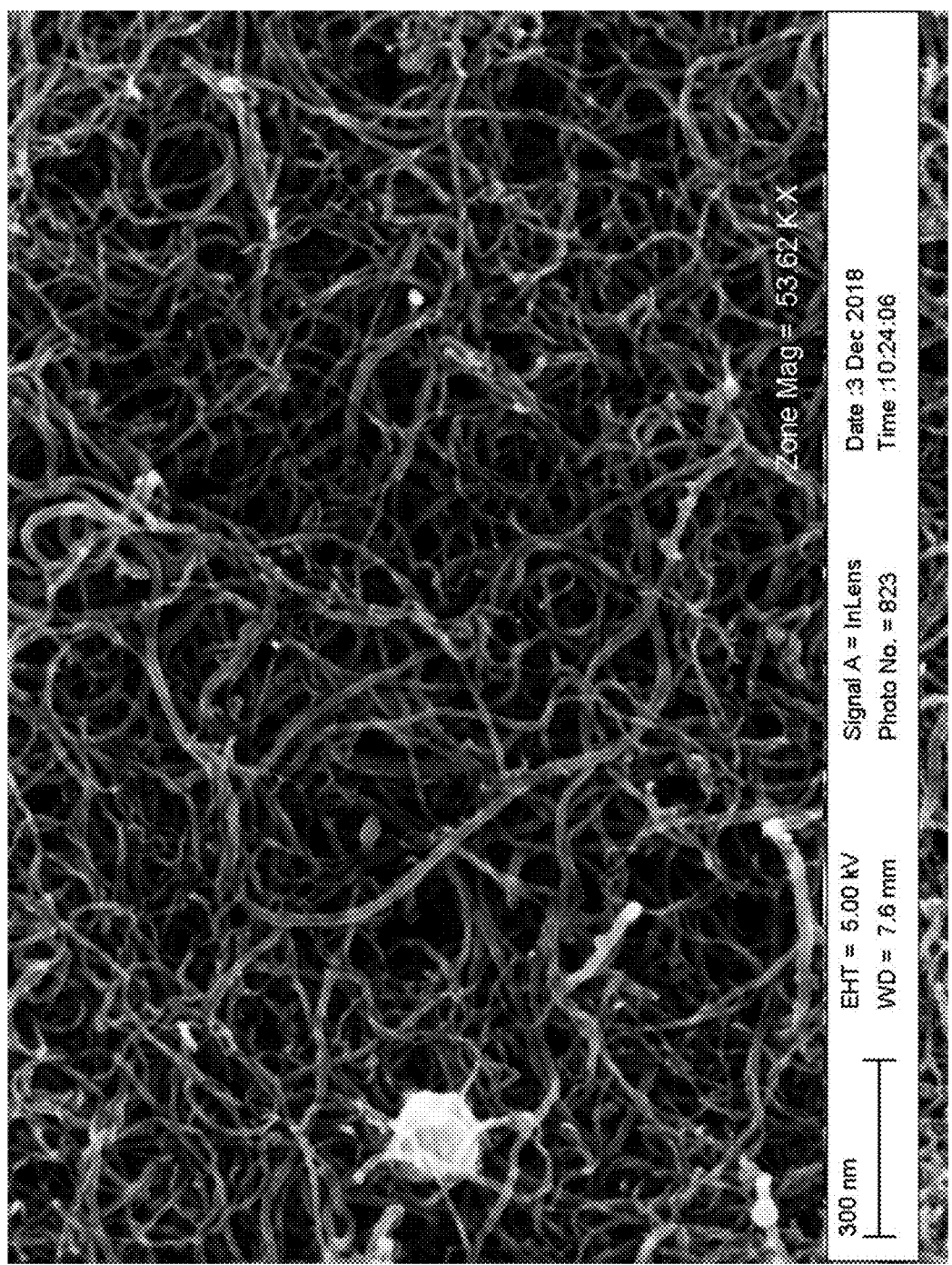
FIG. 4 represents SEM image of a CoPc/MWCNT/Nafion film.

The inventors report the use of cobalt phthalocyanine (CoPc, FIG. 1) and its substituted forms as a molecular catalyst 4B for the electrochemical reduction of CO into MeOH in aqueous solutions. The sequential process starting from CO leads successively to HCHO and then $CH_3OH$. Upon mixing the cobalt complex with conductive material that could be multi-wall carbon nanotubes (MWCNT) and a binder that could be Nafion© resin in organic solvent 3 that could be a mixture of ethanol (EtOH) and ethylene glycol, a colloidal, stable ink is obtained. After ink deposition onto electrochemically inert but electronically conductive electrode material, it is dried to give a porous catalytic film as observed upon SEM (FIG. 4). Electrolysis can then be conducted in aqueous solutions under a series of various pH conditions and CO atmosphere, or even inert gases if HCHO is used as the substrate (see Table 1 for a full description). Presence of methanol and hydrogen can then be analysed by $^1$H NMR and gas chromatography (GC) respectively following electrolysis.

The results are summarized in Table 2.

The present patent reveals two major information:

When performing electrolysis under CO atmosphere in neutral aqueous conditions, MeOH is produced in non-negligible amount (with Faradaic efficiency (FE) about 1-2%) and a partial current density $j_{meOH}$=0.06 mA·cm$^{-2}$ (see entries 1-2, Table 2).

Figure 2:
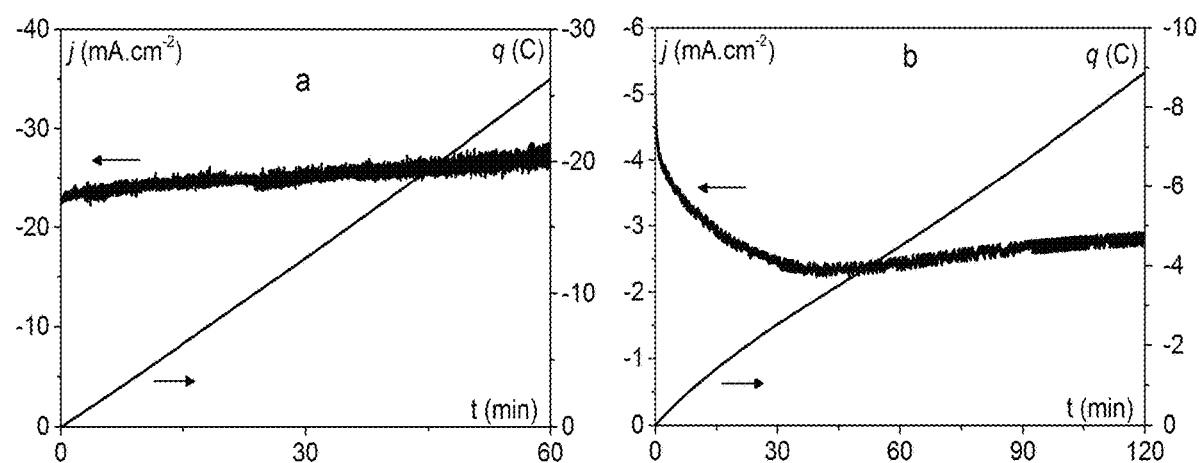
FIG. 2 represents Current density and charge vs. time for:
a) a 1 h electrolysis with 20 mM HCHO (argon atm.) at −0.64 V vs. RHE
b) a 2 h electrolysis under CO atm. (pH 12) at −0.70 V vs. RHE.

Upon raising the solution pH to 12 or 13, and so by decreasing the availability of the necessary protons, Faradaic efficiency and current density for MeOH counter-intuitively improved (entries 3-4 in Table 1 and 2 and FIG. 2a). For example, the Faradaic efficiency for MeOH is improved to 12.0 or 14.3% at E=–0.70 and –0.64 V vs. RHE respectively. At pH 13, the corresponding partial current density $j_{meOH}$ raised by a factor ca. 10 (versus pH 7), going up to 0.68 mA·cm$^{-2}$, while $j_{H2}$ remains of the same order of magnitude.

Figure 3:
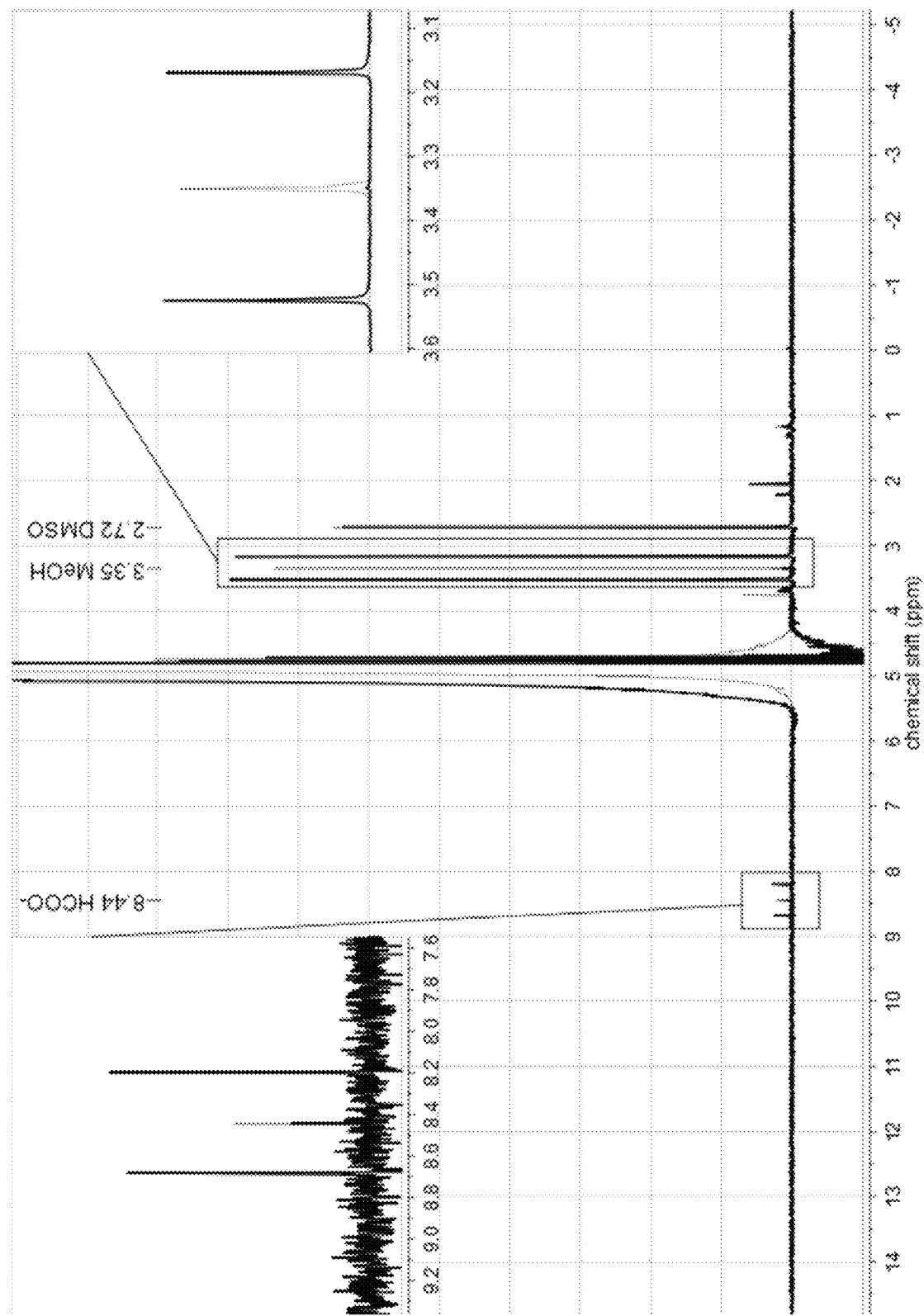
FIG. 3 represents $^1$H NMR spectra of the solution after controlled potential electrolysis (E=−0.64 V vs. RHE, t=2 h) in $^{12}$CO (grey trace) and $^{13}$CO (black trace) saturated solutions at pH 13.

Labelled experiment with $^{13}$CO instead of $^{12}$CO confirmed that the carbon monoxide is the source for methanol (FIG. 3) with a split that is the signature for $^{13}CH_3OH$.

When the pH value is further increased to 14, the activity decreases.

Following a 2 h electrolysis at –0.54 V vs. RHE and pH 13 under CO, formaldehyde (HCHO) is detected in the catholyte solution when analyzed by high pressure liquid chromatography (HPLC) after derivatization with DNPH (see material and method). Its Faradaic efficiency is 3.3%, leading to a complete FE of 87.6% along with $H_2$ and methanol. No other products than formaldehyde, methanol and $H_2$ are detected.

Cannizzaro reaction is taking place during electrolysis, accounting from some formate and a proportion of the analysed methanol.

Figure 6:
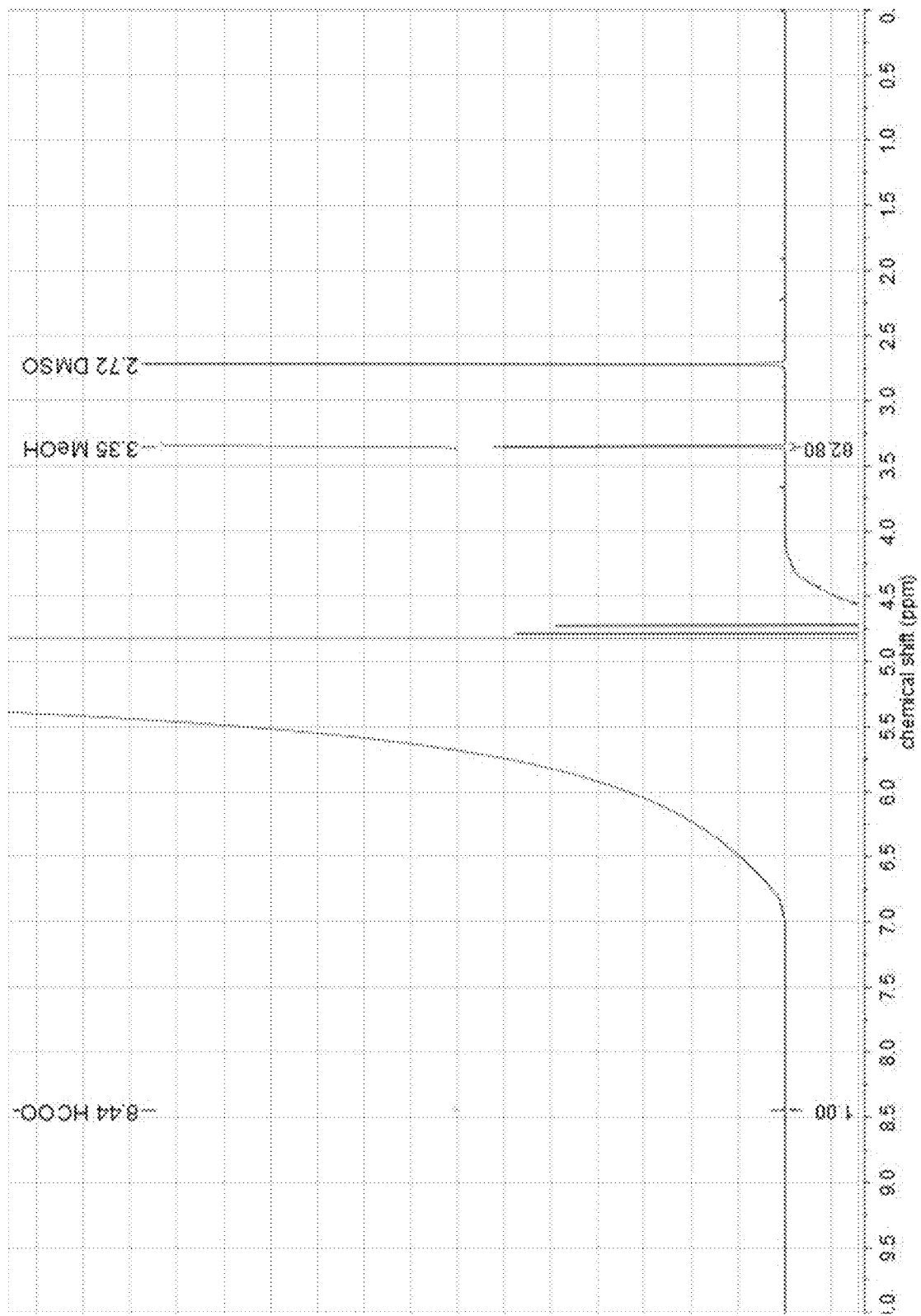
FIG. 6 represents $^1$H NMR spectra of the solution after controlled potential electrolysis (E=−0.70 V vs. RHE, t=2 h) under CO atmosphere at pH 12.

But at the end of an electrolysis in a CO saturated solution at pH 13, the ratio between methanol and formate concentrations is equal to 16 and even to 27 at pH 12 where Cannizzaro is less favoured (FIG. 6 and entry 5, Table 1 and 2). It demonstrates that the Cannizzaro process could only account for a minority of all of the MeOH produced, since this reaction forms stoichiometric quantity of methanol and formate.

Figure 7:
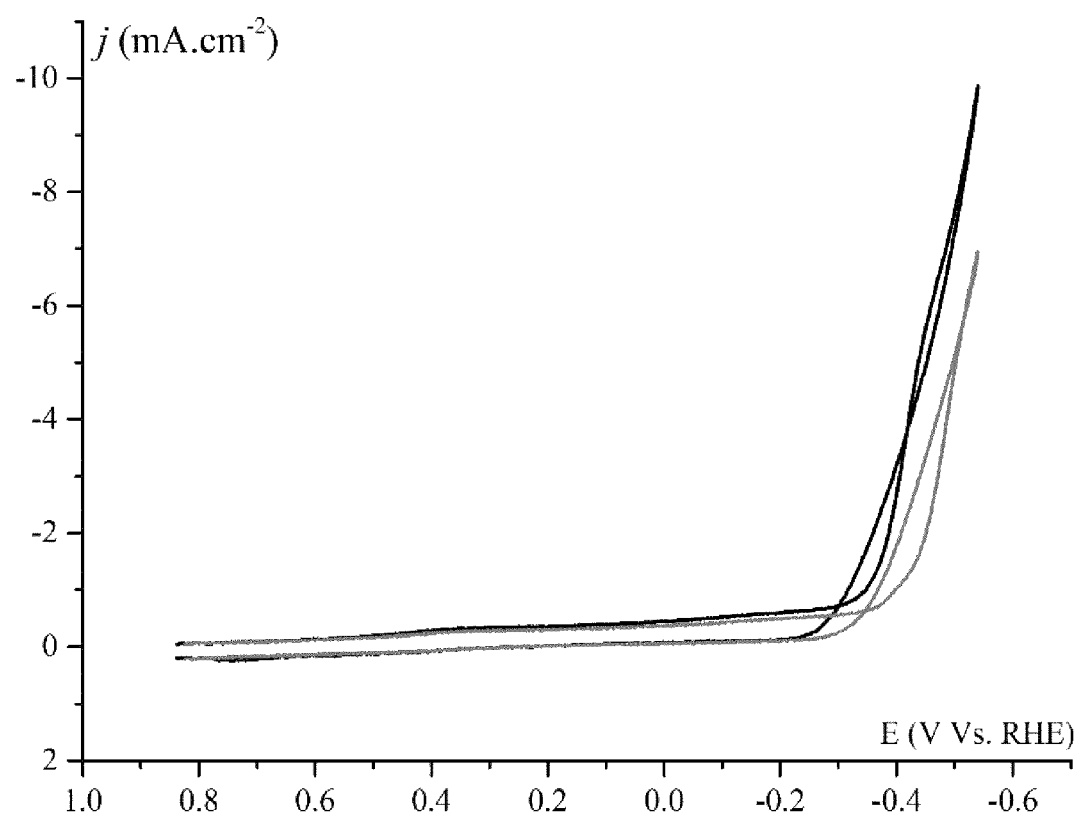
FIG. 7 represents CVs of CoPc/Nafion/MWCNT film (cobalt catalyst concentration=15 nmoles·cm$^{-2}$) in a 0.1 M KOH solution under Ar atmosphere without HCHO (grey trace) and with 20 mM HCHO (black trace). Scan rate=20 mV·s$^{-1}$, geometric electrode surface SWE=0.30 cm$^2$.

This conclusion was also supported by the fact that cyclic voltammetry of the catalytic film provided higher catalytic current in the presence of HCHO than without (FIG. 7). Electrolysis with dissolved formaldehyde performed in an Ar saturated solution (FIG. 2b) gave more than 18% FE for MeOH at a potential of –0.54 V vs. RHE, which corresponds to a low 770 mV overpotential (entry 6, Table 1 and 2). At a slightly more negative electrolysis potential (–0.64 V vs. RHE), a maximum partial current density of 2.9 mA·cm$^{-2}$ was reached (entry 7, Table 1 and 2).

In order to properly evaluate both $j_{meOH}$ and $FE_{meOH}$ values reported in Table 1 and 2, the formate production is quantified after electrolysis and subtracted from the total amount of MeOH as summarized in equation 1.

$$n_{MeOH,Faradaic} = n_{MeOH,total} - n_{MeOH,Cannizzaro} = n_{MeOH,total} - n_{HCOO^-,total} \quad \text{(Eq. 1)}$$

Identification of formaldehyde as an intermediate provides a rational explanation for the decay of $j_{meOH}$ under CO atmosphere when pH is raised from 13 to 14 (see entries 4 and 7 in tables 1&2). Indeed methylene glycol (the aqueous form of formaldehyde) has a pKa of 13[17] and is mostly deprotonated at pH 14. Interestingly, when formate and methanol are used as a starting substrate (respectively 10 and 20 mM, controlled potential electrolysis at –0.64 V vs. RHE and pH 13 for 2 h), no traces of reduction products were detected from GC and $^1$H NMR analysis of the headspace, further illustrating the selectivity of the catalysis towards MeOH formation.

To assess the molecular nature of the catalysis and discard the possibility that the observed reactivity is in fact due to decomposition of CoPc into Co metallic nanoparticles, a series of controlled experiments were performed with various films in CO saturated solutions at pH 13. A first film was prepared with CoPc being replaced by an equivalent amount of Co atoms which were electrodeposited from $CoCl_2$, a second film was obtained from replacing CoPc with an identical concentration of cobalt quaterpyridine (CoQpy), a more fragile catalyst[18] that demetalates at negative potential, and finally a third film was made with CoPc but was electrolyzed at more negative potential (E=–0.99 V vs.

Figure 5:
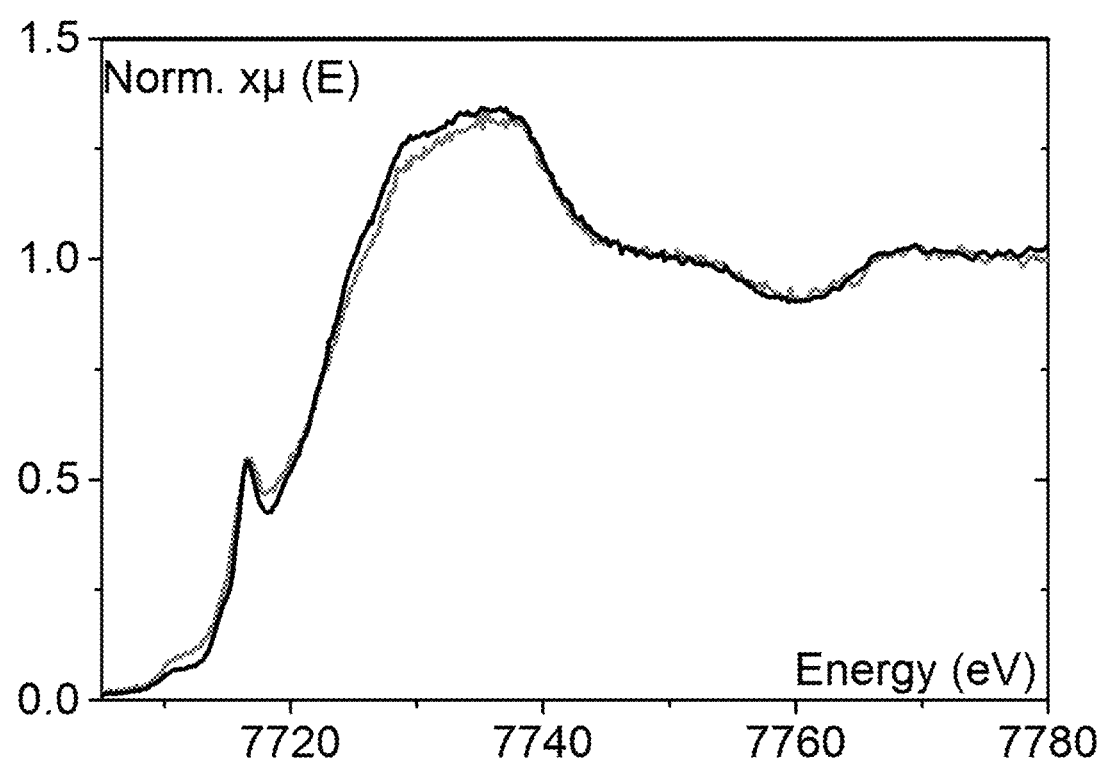
FIG. 5 represents XANES spectra at the energy of cobalt for a film before (grey) and after (black) two hours electrolysis at E=−0.64 V vs. RHE under CO atmosphere (pH 13) that shows absence of degradation of the catalyst metallic center.
Figure 8:
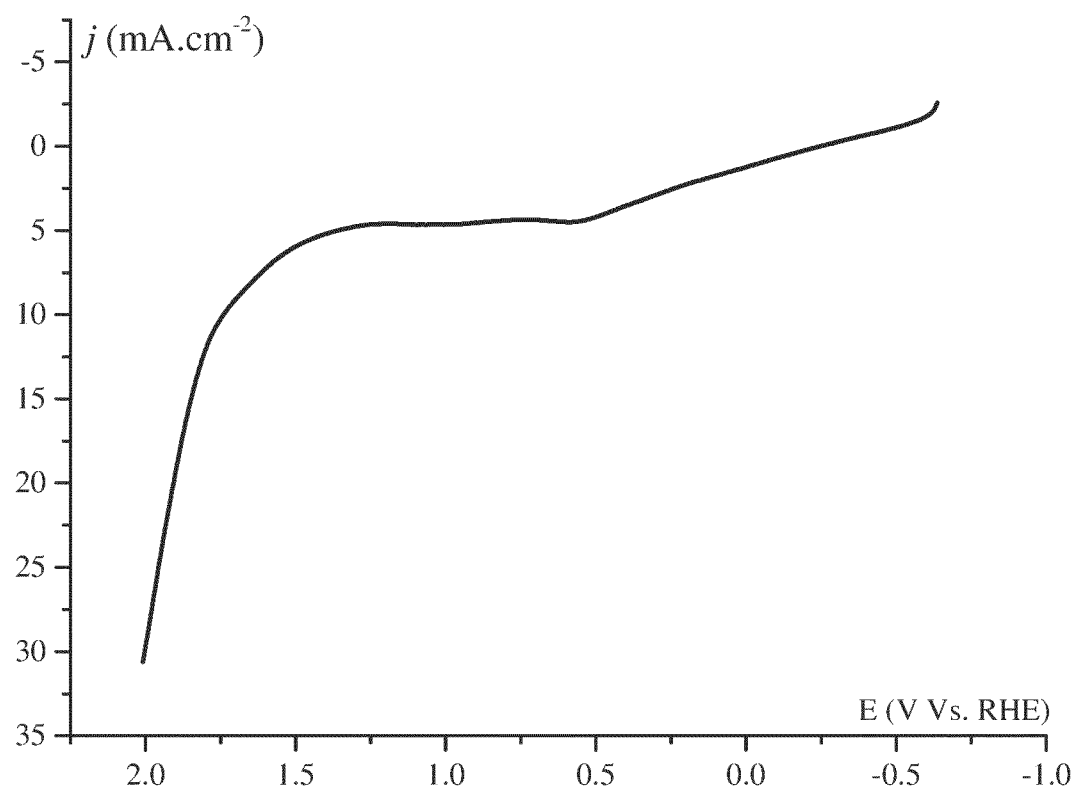
FIG. 8 represents oxidative scan (200 mV·s$^{-1}$) after 2 h controlled potential electrolysis (E=−0.64 V vs. RHE) under CO atmosphere at pH 13.

RHE) to accelerate catalyst transformation into its eventual decomposed form. In all of these experiments, no MeOH was found in the catholyte after electrolysis (entry 9, 10 and 11 in tables 1 and 2). That catalysis is indeed a molecular driven process is also supported by the fact that anodic scan of the catalytic film right after electrolysis failed to detect any oxidative stripping peak that would correspond to oxidation of deposited metallic Co (FIG. 8). Note also that the electronic environment around the cobalt center doesn't show modification since a XANES spectra of the film before and after electrolysis experiment with a film containing CoPc powder are similar (FIG. 5). However the catalyst is progressively deactivated with time, since the Faradaic yield for methanol production decreases after a couple of hours, possibly through reductive hydrogenation of the C—N double bonds of the phthalocyanine core as already reported[19].

Figure 9:
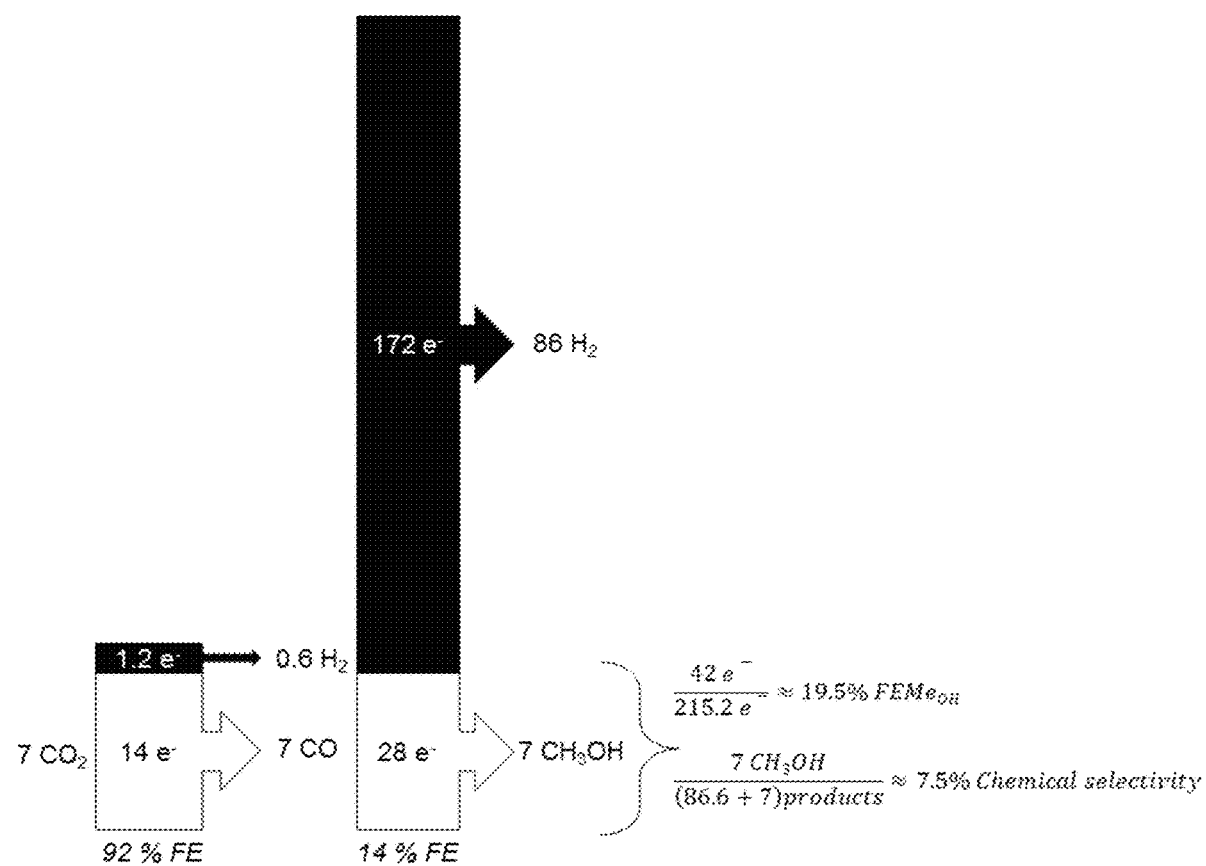
FIG. 9 represents overall faradic efficiency and chemical selectivity for sequential reduction of CO$_2$ to MeOH.
Figure 10:
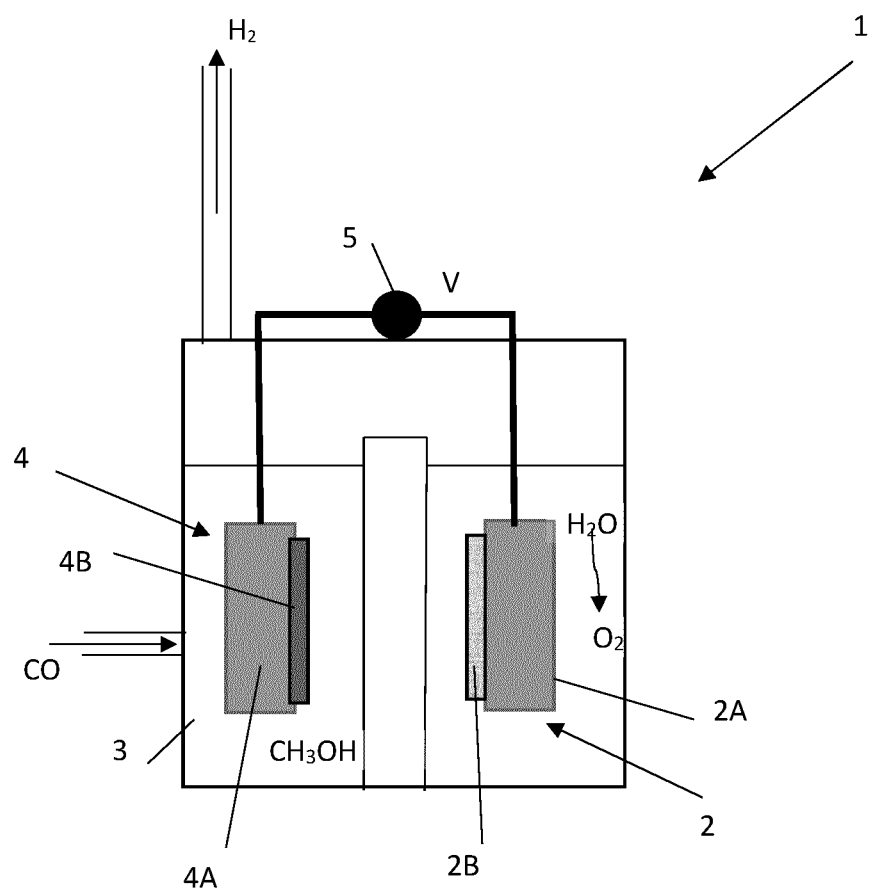
FIG. 10 represents the electrochemical system of the invention to electrochemically reduce CO into liquid methanol and gaseous H$_2$.
Figure 11:
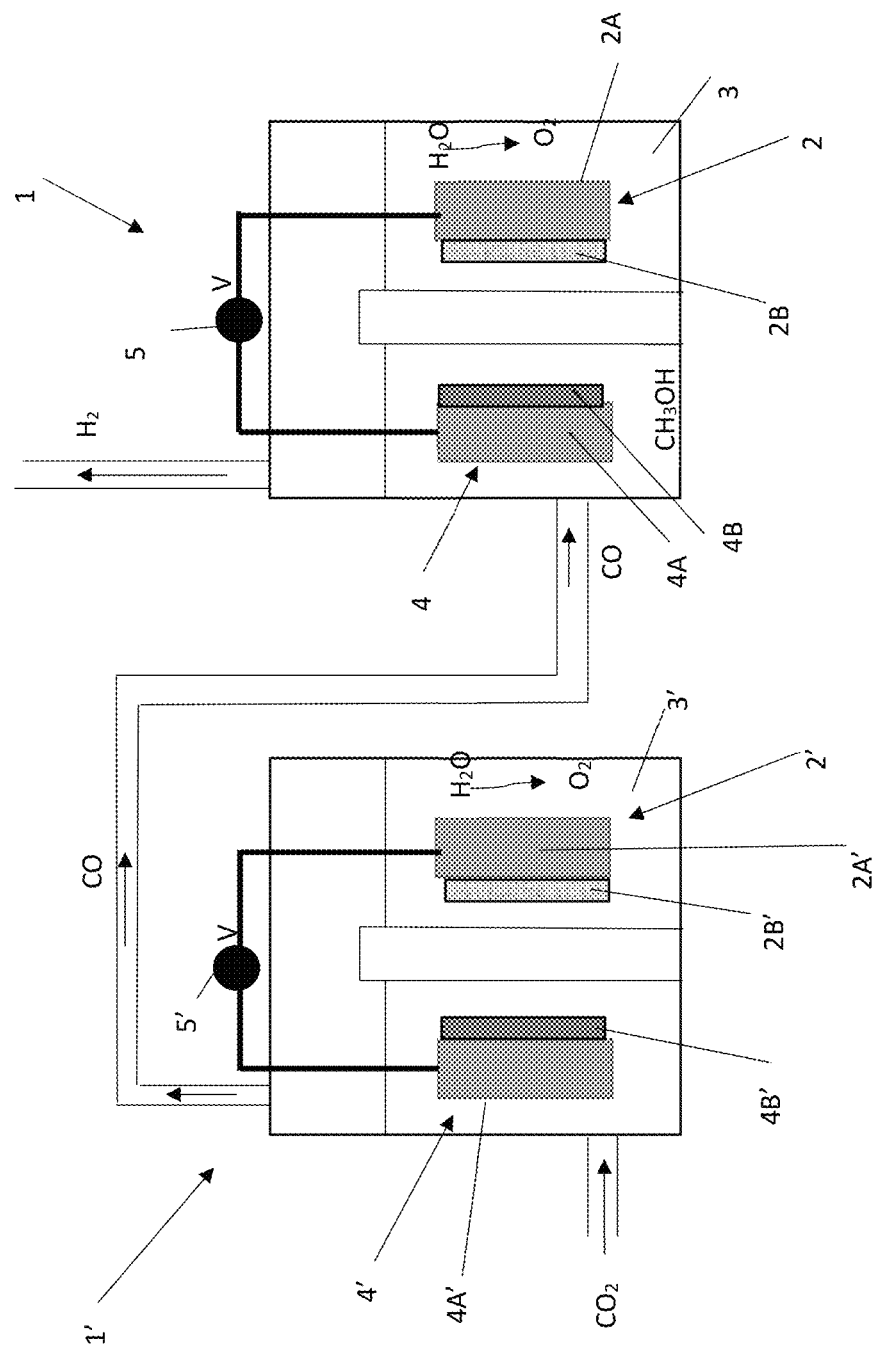
FIGS. 11 and 12 represent the electrochemical device to electrochemically reduce CO$_2$ into methanol and gaseous H$_2$, comprising:
a first electrochemical system to electrochemically reduce CO$_2$ into CO, with a molecular catalyst;
a second electrochemical system to electrochemically reduce CO into liquid methanol and gaseous H$_2$, with the Cobalt molecular catalyst of the present invention.
Figure 12:
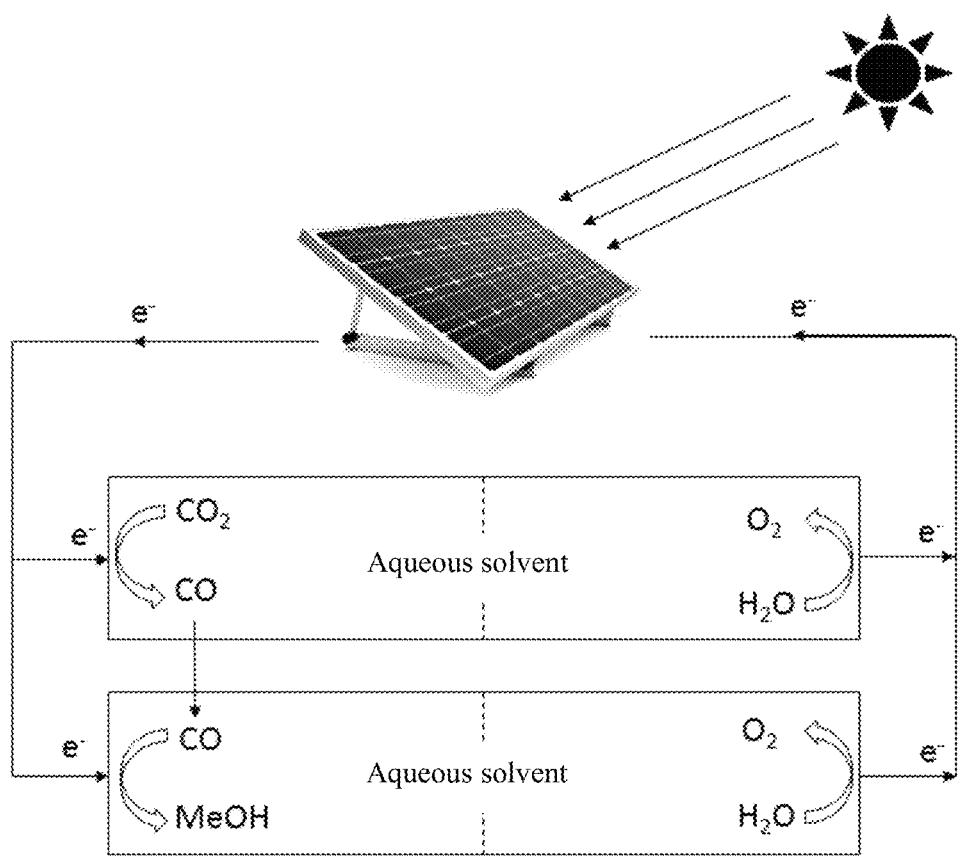
Figure 13:
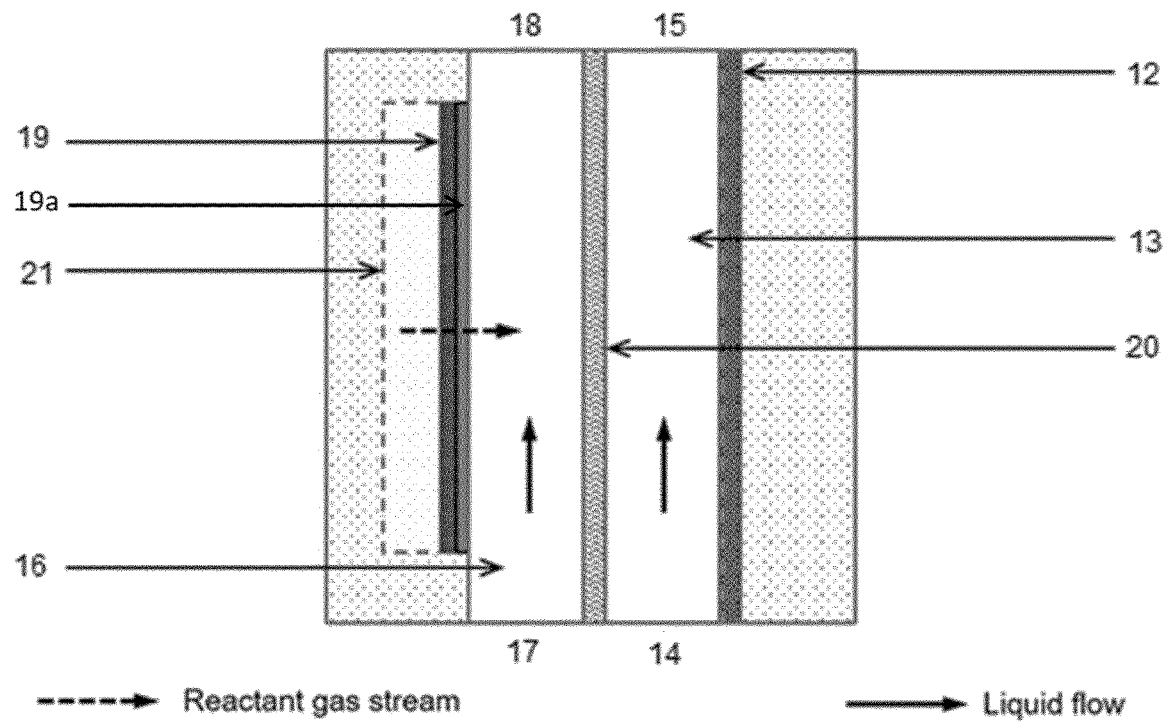
FIG. 13 represents a flow cell which can be used to reduce CO into methanol.
Figure 14:
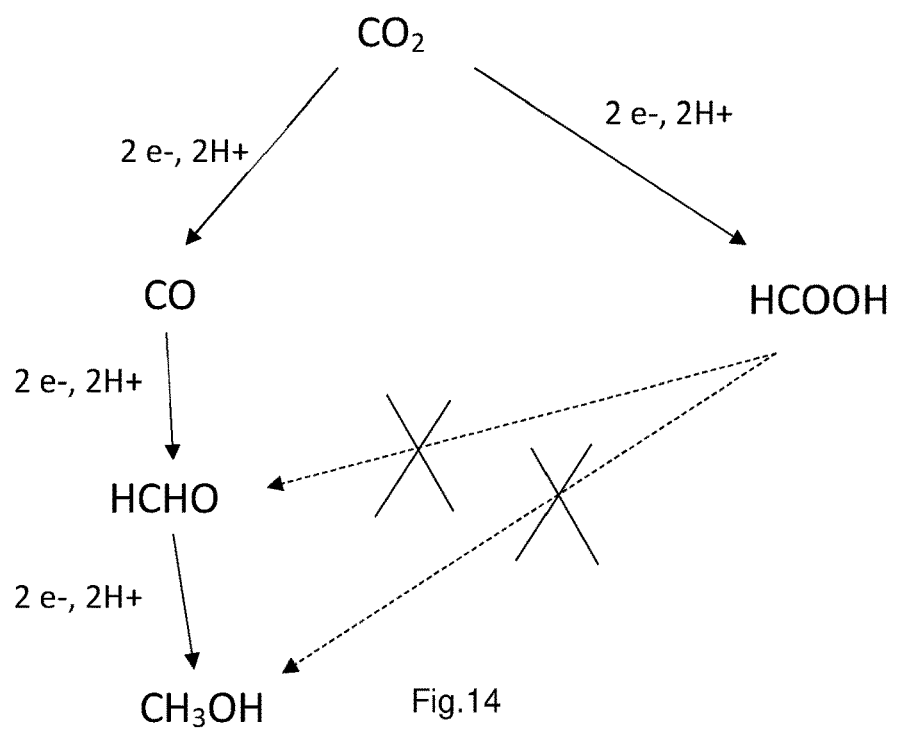
FIG. 14 represents the reactions involved in the present application.

A sequential strategy could be devised for optimizing methanol production. As shown elsewhere[15, 16], CoPc efficiently catalyzes the electrochemical $CO_2$-to-CO conversion with high FE (92%) in aqueous solution at pH 7.2 with high current densities up to 14 mA·cm$^{-2}$. CO can then be used as a reactant and reduced to MeOH in aqueous solution at basic pH with up to 14.3% efficiency (740 mV overpotential). From the total number of electrons used, the global Faradaic efficiency thus amounts to 19.5% and the chemical selectivity is equal to ca. 7.5% (see FIG. 9 for details).

Materials and Methods for Specifically Reported Experiments

Ink and Electrode Preparation

Stock solution of 0.129 mg/mL CoPc (β form, 97% dye content, Sigma Aldrich) and 3 mg/mL MWCNT (6-9 nm diameter 5 μm length, >95% Carbon, Sigma Aldrich) in ethylene glycol (Sigma Aldrich, reagent plus>99%)/absolute ethanol (Merck, analysis grade) mixture (50:50 v/v) were separately prepared and sonicated for 15 minutes. 1 mL from the first solution was then mixed with 2 mL of the second and stirred for one minute, before 30 μL of a Nafion© solution was added (perfluorinated ion exchange Nafion© powder, 5 wt % solution in low aliphatic alcohol/$H_2O$, Sigma Aldrich diluted to 2.9% with ethanol) and stirred for an additional minute. The as prepared ink was then immediately used. Alternatively, it could be stored and used for a few days.

The catalytic electrode was prepared by dropcasting 200 μL of the ink per cm$^2$ of carbon paper (Toray Carbon Paper, TGP-H-60, Alfa Aesar), followed by evaporation in a furnace (T=100° C.).

Catalyst concentration was typically 15.7±0.7 nmol·cm$^{-2}$ after dropcasting.

For formaldehyde quantification with HPLC, an electrode with higher loading (1 mL ink per cm$^2$, so 75 nmol·cm$^{-2}$ catalyst) was used in order to maintain the reduction of CO into HCHO until the end of the electrolysis.

Electrode including CoQpy (cobalt quaterpyridine) as Co complex was made upon the same lines, with a loading of 0.138 mg/mL ($MW_{CoQpy}$=604 g/mol).

Regarding the preparation of the modified electrode with electrodeposited Co, the above procedure was also followed without adding any catalyst. Then, the electrode was dipped into a 50 mM solution of $CoCl_2$ ($CoCl_2 \cdot (H_2O)_6$, Sigma Aldrich) under argon and a negative potential was applied (−0.624 V vs. SCE) until the desired charge was passed (2×16.33 nmol·cm$^{-2}$).

The amount of Co deposited on the film was controlled by dissolving the film (electrode surface 0.825 cm$^2$) in a 3% $HNO_3$ solution followed by filtration and ICP analysis of the solution. It led to 329 ppb of mass cobalt (calc. 318 ppb).

Electrochemical Experiments

Controlled potential electrolysis and cyclic voltrammetry (CVs) were performed using a PARSTAT 4000 or a PARSTAT 2273 potentiostat (Princeton Applied Research). The catalytic film on carbon paper is connected with a clip protected by PTFE tape (Roth). The reference electrodes was a Saturated Calomel Electrode (Hach) positioned as close as possible from the working electrode. Counter electrode was a Platinum grid (Goodfellow) immersed in the same electrolyte but separated by a glass frit bridge (Hach).

Electrolyte was prepared on the day of the experiment by diluting potassium phosphate monobasic (analytical reagent, Prolabo), potassium phosphate dibasic (analytical reagent, Prolabo), potassium phosphate tribasic (analytical reagent, Prolabo), potassium hydroxide (Normapur, Prolabo) were used as received at the concentration mentioned in the main text. For phosphate buffer solutions, pH was adjusted to the experimental value upon addition of acidic or basic constituent.

All potentials were measured vs. a saturated calomel electrode (SCE) and were converted vs. RHE using the following equation (1):

$$E(V \text{ vs. RHE}) = E(V \text{ vs. SCE}) + 0.244 + 0.059 \times pH \quad (1)$$

For the estimation of formaldehyde concentration after paraformaldehyde (Sigma Aldrich) depolymerization, the molecular weight of formaldehyde in paraformaldehyde has been estimated as follows: One chain depolimerization implies the removal of one proton H$^+$ at one side of the chain and one OH$^-$ group at the other side, corresponding to one $H_2O$ overall. The chain length is estimated to lie in between 8 to 100 monomers. So the formula of paraformaldehyde can also be written $(HCHO)_n \cdot H_2O$ with n between 8 and 100.

$N=8$: $MW_{formaldehyde\ in\ paraformaldehyde}$ = $(8\ MW_{formaldehyde} + MW_{Water})/8 = 32.25$ g/mol $N=100$: $MW_{formaldehyde\ in\ paraformaldehyde} = (100\ MW_{formaldehyde} + MW_{Water})/100 = 30.18$ g/mol We took an average value of 31.21 g/mol for the molar mass. Experiments with formaldehyde as the substrate were further conducted with a starting concentration of 20 mM formaldehyde.

Experiment with formate or methanol as the substrate were conducted with potassium formate (Sigma Aldrich, ReagentPlus 99%) and MeOH (VWR, Normapur) with a respective starting concentration of 10 mM HCCOO— and 20 mM MeOH.

All gases were from Air Liquide. Electrolysis with CO as the substrate were performed under 1 atmosphere of the concerned gas, resulting in a respective concentration of 1 mM at 20° C. Electrolysis with HCOO$^-$, HCHO or MeOH as the substrate were performed under 1 atmosphere of Argon.

Electrolysis up to 2 hours were conducted in sealed cells. Longer experiments were made with a flow cell flowing with the headspace free from oxygen.

Products Analysis

Gas chromatography analyses of the gases evolved in the headspace during electrolysis were performed with an Agilent Technologies 7820A GC system equipped with a thermal conductivity detector. CO and $H_2$ production were quantitatively detected and separated with a CP-CarboPlot P7 capillary column (27.46 m in length and 25 pm internal diameter). Temperature was held to 150° C. for the detector and 34° C. for the oven. The carrier gas was argon flowing at 9.5 mL/min at a constant pressure of 0.5 bar.

Injection was performed via a 250 µL gas-tight (Hamilton) syringe previously degassed with the gas of the experiment ($CO_2$, CO or Argon). These conditions allowed for simultaneous detection of both $H_2$, $O_2$, $N_2$, CO, $CO_2$ and $CH_4$. Calibration curves for $H_2$ and CO were determined separately by injecting known quantities of pure gas.

Liquid phase analysis was made with a Bruker AC 400 MHz NMR. Tubes were filled with 480 µL solution (392 µL of the solution of interest to which was added 40 µL of 4 mM DMSO (Sigma Aldrich, Anhydrous 99.8%) and 48 µL of $D_2O$ (Sigma Aldrich, 99% atoms D) as internal standard). A minimum of 128 scans were accumulated with water pre-saturation method and using a relaxation time of 25 s. Quantification was made relative to the DMSO peak.

For all the experiments performed with CO or HCHO as the substrate, quantification of formate was used to estimate the contribution of the Cannizzaro reaction to the obtained products. The amount of formate quantified through $^1H$ NMR analysis was systematically subtracted from the total amount of quantified MeOH so as to only keep the faradaic production of methanol at the electrode. The reported faradaic efficiencies for methanol reported in the text were all calculated following this method.

For direct formaldehyde quantification, 1 mL of electrolyte was mixed with 1 mL of 2,4 DNPH solution at 4 g/L, diluted to 50 mL with acetonitrile and 2 drops of $H_2SO_4$ (50%). 20 µL of this solution were then analyzed by HPLC (Dionex Ultimate 300) equipped with a Waters Spherisorb ODS-2 5 µm particles size column (L: 250 mm×Ø: 4.6 mm). Eluent was a mixture of water Ultrapure and HPLC grace acetonitrile (45:55 v/v) flowing at 1 mL/min flow rate. UV detection was made at 360 nm. The quantification was finally obtained from a calibration plot made on the same day from known concentrations of formaldehyde.

After quantification of products ($n_{product}$), the charge passed for each product is calculated using the following equation (2):

$$q_{product} = n_{e^-} \times F \times n_{product} \quad (2)$$

where $q_{product}$ is the charge passed for a given product, F the faraday constant, $n_{e^-}$ the number of electrons to reduce one molecule of substrate into one molecule of product and $n_{product}$ the quantity of product. Faradic efficiency (FE) could then be calculated from equation (3):

$$FE_{Product} = q_{product}/q_{total} \quad (3)$$

where $q_{total}$ is the total charge flowing through the electrode surface and measured by the potentiostat.

Partial current density $j_{product}$ was obtained upon scaling the total current density $j_{total}$ (equation (4)):

$$j_{product} = FE_{product} \times j_{total} \quad (4)$$

Turnover number (TON) was obtained upon dividing the mol number of product by the mol number of catalyst in the catalytic film (equation (5)):

$$TON_{product} = n_{product}/n_{catalyst} \quad (5)$$

Overpotential for a specific reduction reaction is defined as $E_{applied} - E'^o{}_{(Ox/Red)}$ with:

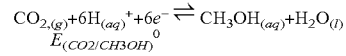

$$E'^o{}_{(Ox/Red)} = E^o{}_{(Ox/Red)} - RT/F \ln(aH_3O^+) = E'^o{}_{(Ox/Red)} - 0.059 \times pH \quad (6)$$

$E'^o{}_{(Ox/Red)}$ for various substrates/methanol redox couples were calculated following this methods:

Starting from $CO_2$, two half-equations were considered:

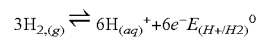

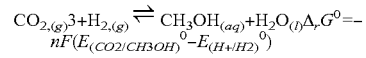

Resulting in

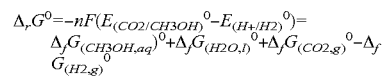

From Hess's law, we may write:

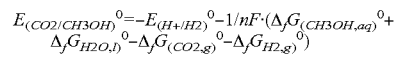

Leading to:

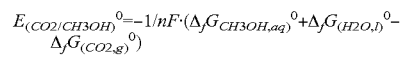

Using the Standard Hydrogen Electrode (SHE) as a reference electrode, and considering $H_2(g)$ as the reference state for hydrogen at 298 K and 1 atm., we may write:

Same approach was followed with other substrates and led to:

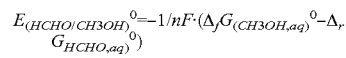

The required Gibbs enthalpies of formation (1 atm. pressure) are:

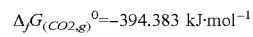

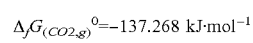

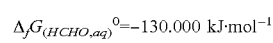

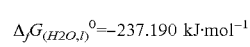

Finally leading to the standard potentials of interest:

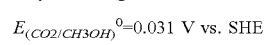

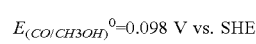

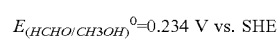

At pH 0, the apparent standard potential ($E'^o$) is equal to the standard potential. For other pH values, and because each electron transfer is coupled to one proton transfer (except for formate, see later), the apparent standard potential shifts by −0.059 V of pH unit vs. SHE. For this reason the Relative Hydrogen Electrode (RHE) is used as a reference all through the document so that $E'^o$ (V vs. RHE) values remain numerically equal to $E^o$ (V vs. SHE) independently of the pH values and allow for proper comparison.

Material Characterization

Scanning electron microscopy (SEM) was performed using a Zeiss Supra 40 field emission gun (SEM-FEG).

X-Ray Photoelectron Spectrometer analyses (XPS) were performed with a THERMO-VG ESCALAB 250 (RX source K Al (1486.6 eV)).

Xray absorption spectra (XAS) were collected at the LUCIA beamline of SOLEIL with a ring energy of 2.75 GeV and a current of 490 mA. The energy was monochromatized by means of a Si 311 double crystal monochromator. Data were collected in a primary vacuum chamber as fluorescence spectra with an outgoing angle of 10° using a Bruker silicon drift detector. The data were normalized to the intensity of the incoming incident energy and processed with the Athena software from the IFEFFIT package. An E0 value of 7709.0 eV was used for the cobalt K-edge energy which was measured at the first inflection point.

TABLE 1

Electrolysis results and Faradaic efficiencies for methanol production using CoPc as catalyst (except for entries 10 (deposited metallic cobalt) and 11 (cobalt quaterpyridine). $CO_2$ and CO were used as reactant substrates upon saturation in water at 25° C. and 1 atm (leading to concentration of 34 and 1 mM respectively at neutral pH). Concentration of $HCOO^-$ and HCHO were 10 and 20 mM respectively.

| # | Substrate | pH | electrolyte | E (V vs. RHE) | η (mV) | t (h) | Cat. | $\Gamma_{Cat.}$ (nmol·cm$^{-2}$) | $V_{electrolyte}$ (mL) | $S_{WE}$ (cm$^2$) |
|---|---|---|---|---|---|---|---|---|---|---|
| 1 | CO | 7 | 0.1M $K_2HPO_4/K_2HPO_4$ | −0.89 | −990 | 2 | CoPc | 15 | 4.5 | 0.38 |
| 2 | CO | 7 | 0.1M $K_2HPO_4/K_2HPO_4$ | −0.99 | −1090 | 2 | CoPc | 15 | 4 | 0.54 |
| 3 | CO | 13 | 0.1M KOH | −0.54 | −640 | 2 | CoPc | 15 | 3.8 | 0.55 |
| 4 | CO | 13 | 0.1M KOH | −0.64 | −740 | 1.5 | CoPc | 16.3 | 7 | 1.10 |
| 5 | CO | 12 | 0.1M $K_2HPO_4/K_3PO_4$ | −0.70 | −800 | 2 | CoPc | 15 | 8 | 0.46 |
| 6 | HCHO | 13 | 0.1M KOH | −0.54 | −770 | 2 | CoPc | 15 | 4 | 0.30 |
| 7 | HCHO | 13 | 0.1M KOH | −0.64 | −870 | 1 | CoPc | 15 | 3.4 | 0.29 |
| 8 | CO | 14 | 1M KOH | −0.63 | −730 | 0.5 | CoPc | 16.3 | 7 | 1.20 |
| 9 | CO | 13 | 0.1M KOH | −0.99 | −1090 | 1 | CoPc | 15 | 8 | 0.24 |
| 10 | CO | 13 | 0.1M KOH | −0.64 | −740 | 1 | Co | 16.9 | 7 | 1.00 |
| 11 | CO | 13 | 0.1M KOH | −0.64 | −740 | 0.5 | CoQpy | 16.3 | 7 | 0.90 |

TABLE 2

Electrolysis results:

| # | jtotal (mA·cm$^{-2}$) | q (C) | H2 FE (%) | H2 j (mA·cm$^{-2}$) | H2 TON | MeOH FE (%) | MeOH j (mA·cm$^{-2}$) | MeOH TON |
|---|---|---|---|---|---|---|---|---|
| 1 | 5.34 | 14.6 | 46.01 | 2.460 | 6095 | 1.06 | 0.060 | 70 |
| 2 | 2.72 | 10.6 | 105.89 | 2.880 | 7137 | 2.27 | 0.060 | 76 |
| 3 | 1.11 | 4.4 | 66.55 | 0.739 | 1833 | 2.94 | 0.033 | 40 |
| 4 | 4.77 | 26.9 | 83.79 | 3.999 | 6501 | 14.34 | 0.684 | 556 |
| 5 | 2.68 | 8.9 | 86.76 | 2.326 | 5767 | 12.05 | 0.323 | 400 |
| 6 | 10.16 | 22.0 | 84.48 | 8.590 | 21285 | 18.21 | 1.850 | 4588 |
| 7 | 25.16 | 26.3 | 86.34 | 21.720 | 27014 | 11.57 | 2.910 | 3621 |
| 8 | 3.08 | 6.7 | 92.55 | 2.854 | 1630 | 0.88 | 0.027 | 10 |
| 9 | 27.77 | 24.0 | 96.14 | 26.780 | 33 | 0.00 | 0.000 | 0 |
| 10 | 2.01 | 7.2 | 47.24 | 0.948 | 1 | 0.00 | 0.000 | 0 |
| 11 | 0.98 | 1.6 | 36.90 | 0.361 | 206 | 0.00 | 0.000 | 0 |

REFERENCES AND NOTES

1 Chang, T.-Y., Liang, R.-M., Wu, P.-W., Chen, J.-Y. & Hsieh, Y.-C. Electrochemical reduction of CO2 by Cu2O-catalyzed carbon clothes. *Mater. Lett.* 63, 1001-1003, (2009).

2 Andrews, E. et al. Electrochemical Reduction of $CO_2$ at Cu Nanocluster/(10Ī0) ZnO Electrodes. *J. Electrochem. Soc.* 160, H841-H846, (2013).

3 Sun, X. et al. Molybdenum-Bismuth Bimetallic Chalcogenide Nanosheets for Highly Efficient Electrocatalytic Reduction of Carbon Dioxide to Methanol. *Angewandte Chemie (International ed. in English)* 55, 6771-6775, (2016).

4 Albo, J., Sáez, A., Solla-Gullón, J., Montiel, V. & Irabien, A. Production of methanol from CO2 electroreduction at Cu2O and Cu2O/ZnO-based electrodes in aqueous solution. *Applied Cat. B* 176-177, 709-717, (2015).

5 Hatsukade, T. et al. Carbon Dioxide Electroreduction using a SilverZinc Alloy. *Energy Technology* 5, 955-961, (2017).

6 Low, Q. H., Loo, N. W. X., Calle-Vallejo, F. & Yeo, B. S. Enhanced Electroreduction of Carbon Dioxide to Methanol Using Zinc Dendrites Pulse-Deposited on Silver Foam. *Angewandte Chemie* 131, 2278-2282, (2019).

7 Kas, R. et al. Electrochemical CO2 reduction on Cu2O-derived copper nanoparticles: controlling the catalytic selectivity of hydrocarbons. *Phys. Chem. Chem. Phys.* 16, 12194-12201, (2014).

8 Kuhl, K. P. et al. Electrocatalytic Conversion of Carbon Dioxide to Methane and Methanol on Transition Metal Surfaces. *Journal of the American Chemical Society* 136, 14107-14113, (2014).

9 Costentin, C., Drouet, S., Robert, M. & Savéant, J.-M. A Local Proton Source Enhances $CO_2$ Electroreduction to CO by a Molecular Fe Catalyst. *Science* 338, 90-94, (2012).

10 Azcarate, I., Costentin, C., Robert, M. & Savéant, J.-M. Through-Space Charge Interaction Substituent Effects in Molecular Catalysis Leading to the Design of the Most Efficient Catalyst of $CO_2$-to-CO Electrochemical Conversion. *Journal of the American Chemical Society* 138, 16639-16644, (2016).

11 Ogura, K. & Yamasaki, S. Conversion of carbon monoxide into methanol at room temperature and atmospheric pressure. *Journal of the Chemical Society, Faraday Transactions* 1: *Physical Chemistry in Condensed Phases* 81, 267-271, (1985).

12 Ogura, K. & Takamagari, K. Electrocatalytic reduction of carbon dioxide to methanol. Part 2. Effects of metal complex and primary alcohol. *Journal of the Chemical Society, Dalton Transactions*, 1519-1523, (1986).

13 Ogura, K. & Yoshida, I. Electrocatalytic reduction of CO2 to methanol: Part 9: Mediation with metal porphyrins. *Journal of Molecular Catalysis* 47, 51-57, (1988).

14 Haas, T., Krause, R., Weber, R., Demler, M. & Schmid, G. Technical photosynthesis involving $CO_2$ electrolysis and fermentation. *Nature Catalysis* 1, 32-39, (2018).

15 Ren, S. et al. Molecular electrocatalysts can mediate fast, selective $CO_2$ reduction in a flow cell. *Science* 365, 367, (2019).

16 Wang, M. et al. $CO_2$ electrochemical catalytic reduction with a highly active cobalt phthalocyanine. *Nature Communications* 10, 3602, (2019).

17 Walker, J. F. in *Formaldehyde—Monograph series no. 159* (ed American Chemical Society) Ch. 5, 106-122 (1964).

18 Wang, M., Chen, L., Lau, T.-C. & Robert, M. Hybrid CO Quaterpyridine Complex/Carbon Nanotube Catalytic Material for $CO_2$ Reduction in Water. *Angewandte Chemie International Edition* 57, 7769-7773, (2018).

19 Gund, F. New Developments in the Application of Phthalocyanines in Textile Printing. *Journal of the Society of Dyers and Colourists* 69, 671-682, (1953).

The invention claimed is:

1. Electrochemical system to electrochemically reduce CO into liquid methanol and deliver by-product gaseous $H_2$, comprising an electrochemical cell with:
   an anodic compartment with:
      an anode with an anode current collector, and on the anode current collector, at least a catalyst to electrochemically oxidize $H_2O$ to $O_2$,
      an anodic electrolyte solution comprising a solvent, and an anodic supporting electrolyte, the solvent being water at a pH between 10.5 and 13.5;
   a cathodic compartment with:
      a cathodic electrolyte solution comprising the solvent, and a cathodic supporting electrolyte;
      the reagent CO;
   a cathode which comprises, on a cathode current collector which is electrochemically inert, at least a molecular catalyst to electrochemically reduce CO into liquid methanol and to deliver the by-product gaseous $H_2$, the molecular catalyst comprising a cobalt phthalocyanine or substituted form thereof is selected from: compounds having formula I:

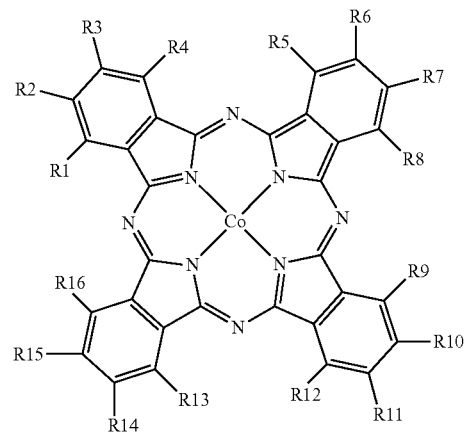

wherein:
   $R_1$ to $R_{16}$ are independently selected from the groups consisting of H, F, $+N(C_1-C_4\ alkyl)_3$ groups, or
   one or several of the following specific groups $R_1$, $R_4$, $R_5$, $R_8$, $R_9$, $R_{12}$, $R_{13}$ and $R_{16}$ being a phenyl group bearing $+N(C_1-C_4\ alkyl)_3$ substituent in ortho position, the others of those specific groups being H;
Or the compound of formula:

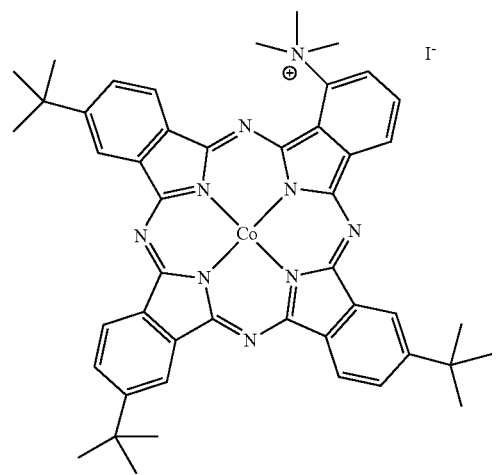

a power supply providing energy necessary to trigger electrochemical reactions involving a gas reagent comprising said CO.

2. The electrochemical system according to claim 1, wherein at least 1 and at most 8 groups among $R_1$ to $R_{16}$ are independently $+N(C_1-C_4\ alkyl)_3$, and the other groups among $R_1$ to $R_{16}$ are H.

3. The electrochemical system according to claim 1, wherein at least 1 to 16 groups among $R_1$ to $R_{16}$ are independently F, and the other groups among $R_1$ to $R_{16}$ are H.

4. The electrochemical system according to claim 1, wherein at least 1 and at most 8 groups among $R_1$, $R_4$, $R_5$, $R_8$, $R_9$, $R_{12}$, $R_{13}$ and $R_{16}$ being are independently a phenyl group bearing a $+N(C_1-C_4\ alkyl)_3$ group in ortho position, and the other groups among $R_1$ to $R_{16}$ are H.

5. The electrochemical system according to claim 1, wherein the molecular catalyst is a cobalt phthalocyanine CoPc of formula:

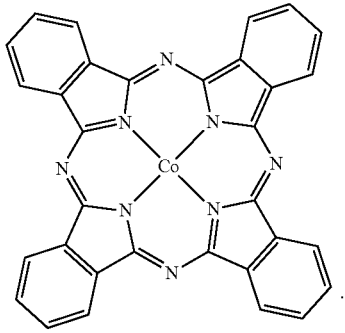

6. The electrochemical system according to claim 1, wherein the molecular catalyst is a cobalt phthalocyanine CoPc of formula:

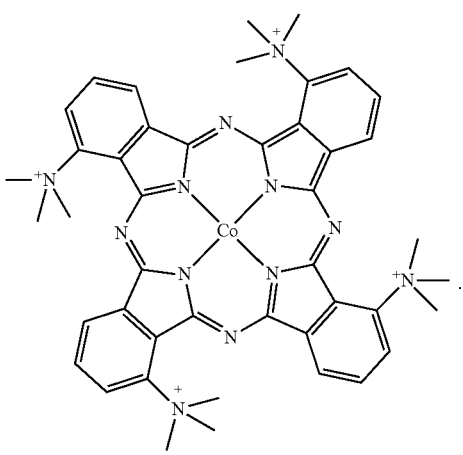

7. The electrochemical system according to claim 1, wherein the solvent has a pH between 12 and 13.

8. The electrochemical system according to claim 1, wherein the cathode comprises on the cathode current collector, an electrode film deposit which contains: the molecular catalyst, at least a binder, and optionally conductive materials as additives.

9. The electrochemical system according to claim 8, wherein the molecular catalyst in the electrode film deposit is in a concentration of between 1 $nmol \cdot cm^{-2}$ and 100 $\mu mol \cdot cm^{-2}$.

10. The electrochemical system according to claim 8, wherein the cathode current collector is carbon paper, the binder is Nafion@ resin, the conductive materials are made of carbon nanotubes, or carbon powder, or reduced graphene oxide or graphite powder.

11. Electrochemical device to electrochemically reduce $CO_2$ into methanol and deliver by-product gaseous $H_2$, comprising:
    a first electrochemical system adapted to electrochemically reduce $CO_2$ into CO with a first-system molecular catalyst, and
    a second electrochemical system adapted to electrochemically reduce CO into methanol and gaseous $H_2$, comprising the electrochemical system according to claim 1.

12. The electrochemical device according to claim 11, wherein the first electrochemical system to electrochemically reduce $CO_2$ into CO comprises an electrochemical cell with:
    a further anodic compartment with:
        an anode with a further anode current collector, and on the further current collector, at least a further catalyst to electrochemically oxidize $H_2O$,
        a further anodic electrolyte solution comprising said solvent, and a further anodic supporting electrolyte;
    a further cathodic compartment with:
        a further cathodic electrolyte solution comprising the solvent, and a further cathodic supporting electrolyte;
        the reagent $CO_2$;
        a further cathode which comprises, on a further cathode current collector, at least a further molecular catalyst to electrochemically reduce $CO_2$ into CO, the further molecular catalyst being of formula I;

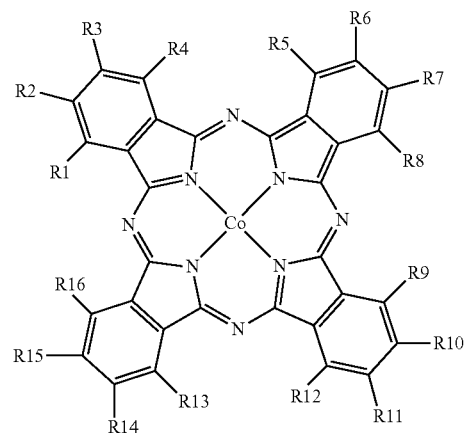

a further power supply providing energy necessary to trigger electrochemical reactions involving the gas reagent.

13. The electrochemical device according to claim 12, wherein the first-system molecular catalyst is the same as the further molecular catalyst.

14. An electrochemical system comprising a flow cell adapted to electrochemically reduce a gas reactant comprising CO, passing through a gas diffusion electrode, into methanol, comprising:
    an anodic compartment comprising:
        an anode with an anode current collector, and on the anode current collector, a first catalyst to electrochemically oxidize $H_2O$ to $O_2$,
        an anodic electrolyte solution, flowable at a controlled flow rate $Q_a$, comprising: a solvent, and an anodic electrolyte, the solvent being water at a pH between 10.5 and 13.5,
        an anodic electrolyte solution inlet and an anodic electrolyte solution outlet connected to the anodic compartment, adapted to circulate the anodic electrolyte solution;
    a cathodic compartment comprising:
        a cathodic electrolyte solution, flowable at a controlled flow rate $Q_c$, comprising: said solvent,
        a cathodic electrolyte solution inlet and a cathodic electrolyte solution outlet connected to the cathodic compartment, adapted to circulate the cathodic electrolyte solution, and remaining reagent gaseous CO and methanol by the cathodic electrolyte solution outlet;

a gas diffusion electrode comprising on an electrochemically inert gas diffusion porous current collector of surface S, a second molecular catalyst adapted to electrochemically reduce the gas reactant comprising CO into methanol in the cathodic electrolyte solution, with by-production of gaseous H2, said second molecular catalyst comprising a cobalt phthalocyanine or substituted form thereof that is selected from:

compounds having formula I:

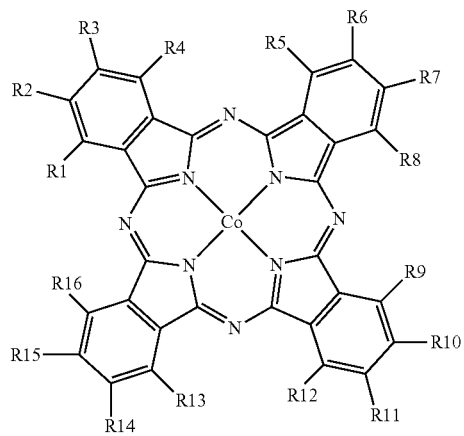

wherein:
$R_1$ to $R_{16}$ are independently selected from the groups consisting of H, F, $+N(C_1-C_4 \text{ alkyl})_3$ groups, or one or several of the following specific groups $R_1$, $R_4$, $R_5$, $R_8$, $R_9$, $R_{12}$, $R_{13}$ and $R_{16}$ being a phenyl group bearing $+N(C_1-C_4 \text{ alkyl})_3$ substituent in ortho position, the others of those specific groups being H;

Or the compound of formula:

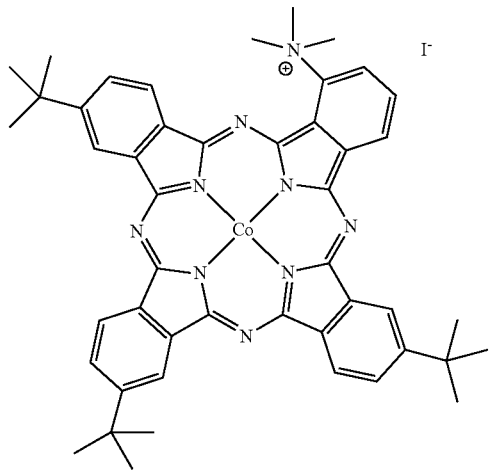

an anion exchange membrane, impermeable to CO, $H_2$ and $O_2$, between the anodic compartment and the cathodic compartment;

a channel adapted to pass the reagent gaseous CO, at a controlled flow rate $Q_g$, through the porous surface S of the gas diffusion electrode, while the cathodic electrolyte solution circulates in between the gas diffusion electrode and the anion exchange membrane;

pumping means adapted to:
  Circulate by pumping the anodic electrolyte solution in the anodic compartment and the cathodic electrolyte solution in the cathodic compartment between their respective inlets and the outlets,
  Control flow by pumping gaseous CO in the channel, passing through the gas diffusion porous cathode.

* * * * *